(12) United States Patent
Hawley

(10) Patent No.: US 11,951,987 B2
(45) Date of Patent: Apr. 9, 2024

(54) CREEP TORQUE FEEDBACK TO IMPROVE CONTROLLABLY MANEUVERING A VEHICLE

(71) Applicant: TOYOTA MOTOR ENGINEERING & MANUFACTURING NORTH AMERICA, INC., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 323 days.

(21) Appl. No.: 17/507,178

(22) Filed: Oct. 21, 2021

(65) Prior Publication Data

US 2023/0125618 A1    Apr. 27, 2023

(51) Int. Cl.
*B60W 30/18* (2012.01)
*B60W 50/10* (2012.01)

(52) U.S. Cl.
CPC ...... *B60W 30/18063* (2013.01); *B60W 30/18109* (2013.01); *B60W 50/10* (2013.01); *B60W 2510/1025* (2013.01)

(58) Field of Classification Search
CPC ..... B60W 30/18063; B60W 30/18109; B60W 50/10; B60W 2510/1025; B60W 2300/14; B60W 10/06; B60W 10/08; B60W 10/18; B60W 20/10; B60W 2050/0008; B60W 2520/06; B60W 2520/10; B60W 2520/105; B60W 2540/10; B60W 2540/12; B60W 2540/16; B60W 2554/802; B60W 2710/0666; B60W 2710/0672; B60W 2710/083; B60W 2710/085;
(Continued)

(56) References Cited

U.S. PATENT DOCUMENTS 6,533,081 B2    3/2003   Totsuka
7,295,918 B2   11/2007   Nada
(Continued)

FOREIGN PATENT DOCUMENTS

CN    109131330 B    2/2020
JP      5878906 B2    3/2016
(Continued)

*Primary Examiner* — Sze-Hon Kong
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for adjusting the creep torque to maneuver a vehicle to a target location. In various embodiments, the creep torque adjustment mode is deactivated when the driver changes the direction of travel. The change in direction also causes the parameters of the creep torque control to be reinitiated to their initial values. In various embodiments, the creep torque mode is increased from a low creep towards a target creep. If the driver engages the brakes, the input torque is set to zero, and when the driver releases the brake, the minimum creep torque is set to the value that creep torque had risen to just before the brake was applied. This allows the driver to control the acceleration and speed, by just braking. In various embodiments, the creep control controls reverse creep to aid in hooking up a vehicle to a trailer.

20 Claims, 11 Drawing Sheets

(58) Field of Classification Search
CPC ....... B60W 2720/10; B60W 2720/106; B60W 30/18036; Y02T 10/72
See application file for complete search history.

(56) References Cited

U.S. PATENT DOCUMENTS

| | | | |
|---|---|---|---|
| 8,315,752 | B2 | 11/2012 | Kwon |
| 8,957,618 | B2 | 2/2015 | Tadano |
| 8,958,944 | B2 | 2/2015 | Jung |
| 10,800,420 | B1* | 10/2020 | Yang .................. B60W 30/188 |
| 2002/0128115 | A1* | 9/2002 | Narita ............. B60W 30/18063 |
| | | | 477/120 |
| 2010/0235043 | A1* | 9/2010 | Seta ...................... B60L 3/0076 |
| | | | 701/29.2 |
| 2013/0124021 | A1 | 5/2013 | Chung |
| 2016/0257222 | A1* | 9/2016 | Nakagawa ........... B60L 53/126 |
| 2018/0162367 | A1* | 6/2018 | Oh ........................ B60W 40/00 |
| 2020/0171962 | A1* | 6/2020 | Han ...................... B60W 10/08 |
| 2022/0324329 | A1* | 10/2022 | Hanson .................. B60K 37/06 |
| 2023/0081570 | A1* | 3/2023 | Song .................... B60W 10/04 |
| | | | 477/118 |

FOREIGN PATENT DOCUMENTS

| | | |
|---|---|---|
| KR | 100770394 B1 | 10/2007 |
| KR | 100783904 B1 | 12/2007 |

\* cited by examiner

CREEP TORQUE FEEDBACK TO IMPROVE CONTROLLABLY MANEUVERING A VEHICLE

TECHNICAL FIELD

The present disclosure relates generally to controlling creep torque, and in particular, some implementations may relate to controlling creep torque to maneuver to a target location.

DESCRIPTION OF RELATED ART

The "no-load-level-ground-creep-generated-vehicle-speed," as used herein, is the speed that the vehicle maintains when the brake and accelerator are not applied, while the vehicle has no load and is on level ground. The "creep-generated-vehicle-speed," as used herein, is the speed that the vehicle maintains when the brake and accelerator are not applied. If the vehicle is initially standing still while the brake is released and the accelerator is not applied, the vehicle will accelerate until the creep-generated-vehicle-speed is reached and then travel at the creep-generated-vehicle-speed. If the vehicle is not traveling downhill and if the incline of the road remains the same, the creep-generated-vehicle-speed, is a constant speed. When coasting with no load on level ground or uphill, the vehicle will eventually slow down to the creep-generated-vehicle-speed, assuming that the "creep torque" is great enough to keep the vehicle from moving in the opposite direction from a desired direction, despite any uphill incline. In an electric vehicle, the motor may be turned off when the driver is not depressing/engaging the accelerator, and the vehicle is stopped. The "creep torque" is the torque applied by the engine or motor while the vehicle is at a standstill and the accelerator is not engaged. The creep torque creates the creep-generated-vehicle-speed. The creep-torque may be adjusted to avoid a brake noise that may otherwise be made when the brakes are released. The brake noise occurs when the brake is released if the creep torque is greater than the brake torque. The phenomena that causes the brake noise is an initial instantaneous sticking of the brake pad to the rotor, due to static friction. As the brake begins to slide, the relevant friction coefficient changes from the static friction coefficient to the kinetic friction coefficient. Since kinetic friction coefficient is less than the static friction coefficient, the brake slips in response to the decrease in friction. The subsequent sequential sticking and slipping of the brake excites vibrations, in the form of a squealing noise. By reducing the creep torque there is less slipping and therefore less squealing.

BRIEF SUMMARY OF THE DISCLOSURE

According to various embodiments of the disclosed technology vehicle control system and method are provided, having a vehicle control system comprising: a processor; a memory storing one or more instructions, which when executed, cause the processor to: determine whether defined conditions for controlling creep torque are met; and produce a control signal to increase an input torque, and cause the vehicle to reach a target creep-generated-vehicle-speed, the control signal being produced in response to determining that the defined conditions for controlling the creep torque are met, wherein after the defined conditions for controlling creep torque are met, an acceleration that is applied while a brake is not engaged, the selectable acceleration being selected by engaging the brake at a selected acceleration and disengaging the brake.

Embodiments of the system and method may include one or more of the following features. Whether the defined conditions are met is determined by determining whether a speed of the vehicle is lower than a threshold speed. The defined conditions are met is determined by determining whether an acceleration of the vehicle is lower than a threshold acceleration. The one or more instructions, which when executed, further cause the processor to: set a maximum acceleration. The one or more instructions, which when executed, further cause the processor to: determine whether an accelerator is engaged, and interrupt a creep control algorithm, when the accelerator is engaged.

Embodiments of the system and method may include one or more of the following features. The control signal that is produced causes: increasing a creep torque from an initial creep torque towards a maximum creep torque. The control signal being produced for traveling in a particular direction associated with a particular state of a shift; the one or more instructions, which when executed, further cause the processor to determine whether the shift was removed from the particular state; and if it is determined that the shift was removed from the particular state, the acceleration that is applied while the brake is not being applied, is no longer selectable by the engaging of the brake at the selected acceleration and the disengaging of the brake.

Embodiments of the system and method may include one or more of the following features. The torque control being a reverse creep torque control and the one or more instructions, which when executed, further cause the processor to determine whether the vehicle was removed from a reverse state; and if it is determined that the vehicle has been removed from the reverse state, the acceleration that is applied while the brake is not being applied, is no longer selectable by engaging of the brake at the selected acceleration and the disengaging of the brake. The one or more instructions being activated by receiving input from a user interface.

Embodiments of the system and method may include one or more of the following features. The one or more instructions, which when executed, further cause the processor to determine a target distance to travel while controlling the creep torque. The one or more instructions, which when executed, further cause the processor to detect that the vehicle has been shifted out of reverse, and in response reinitiating a creep control parameter to an initial value that the creep control parameter had prior to entering a creep control mode, during the creep control mode, when the one or more instructions are executed, the processor is caused to determine whether the defined conditions for controlling creep torque are met; and produce the control signal. The creep control parameter including a vehicle acceleration. The creep control parameter including the input torque.

Embodiments of the system and method may include one or more of the following features. The control signal causing an acceleration of the vehicle until a threshold speed is reached that is less than the target creep-generated-vehicle-speed. The control signal causing the acceleration to decrease at a defined rate when the threshold speed is reached, without decreasing the acceleration to zero, until the target creep-generated-vehicle-speed is reached. The one or more instructions, which when executed, further cause the processor to, after reaching a threshold speed, control the speed, via a feedback control, to keep the speed at the target creep-generated-vehicle-speed.

A vehicle control system comprising: a processor; a memory storing one or more instructions, which when executed, cause the processor to: determine whether defined conditions for controlling creep torque are met; and in response to determining that the defined conditions for controlling the creep torque are met, produce a control signal to: increase an input torque; cause the vehicle to increase speed towards a target creep-generated-vehicle-speed; detect the brake being engaged; in response to detecting the brake being engaged, storing a value of the input torque that was achieved prior to detecting the brake being engaged; detect the brake being disengaged; and in response detecting the brake being disengaged, setting the input torque to the value stored.

According to various embodiments of the disclosed technology vehicle control system and method are provided, having a vehicle control system comprising: a processor; a memory storing one or more instructions, which when executed cause the processor to: determine whether defined conditions for controlling creep torque are met; where whether the defined conditions for controlling creep torque are met is determined by: determining whether a vehicle acceleration is lower than a threshold acceleration; determining whether a vehicle speed is lower than a threshold speed; determining whether the brake is engaged; and determining whether the accelerator is engaged; wherein if the brake is determined to be engaged, then determining that the defined conditions are not met; if the accelerator is determined to be engaged, then determining that the defined conditions are not met; if the vehicle acceleration is determined to be above the acceleration threshold, then determining that the defined conditions are not met; and if the vehicle speed is determined to be greater than the threshold speed, then determining that the defined determined conditions are met; and in response to the defined conditions being met, produce a control signal to increase an input torque, and to cause the vehicle to reach a target creep-generated-vehicle-speed, wherein after the defined conditions for controlling creep torque are met, an acceleration that is applied selectable by applying the brake at a selected acceleration, wherein after the applying the brake to select the acceleration, the input torque is set to produce the selected acceleration when the brake is no longer being applied.

Embodiments of the system and method may include one or more of the following features. The control signal being produced for traveling in a particular direction associated with a particular state of a shift; the one or more instructions, which when executed, further cause the processor to: determine whether the shift was removed from the particular state; and if it is determined that the shift has been removed from the particular state, terminate a creep torque control mode, during which the acceleration that is applied while the brake is not being applied, is selectable by the engaging of the brake at the selected acceleration and the disengaging of the brake. Whether the defined conditions for controlling creep torque are met is determined by detecting whether the vehicle is in position for aligning a portion of a hookup that is on the vehicle with a portion of the hookup that is on a trailer, to facilitate hooking up the trailer to the vehicle, via the hookup.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
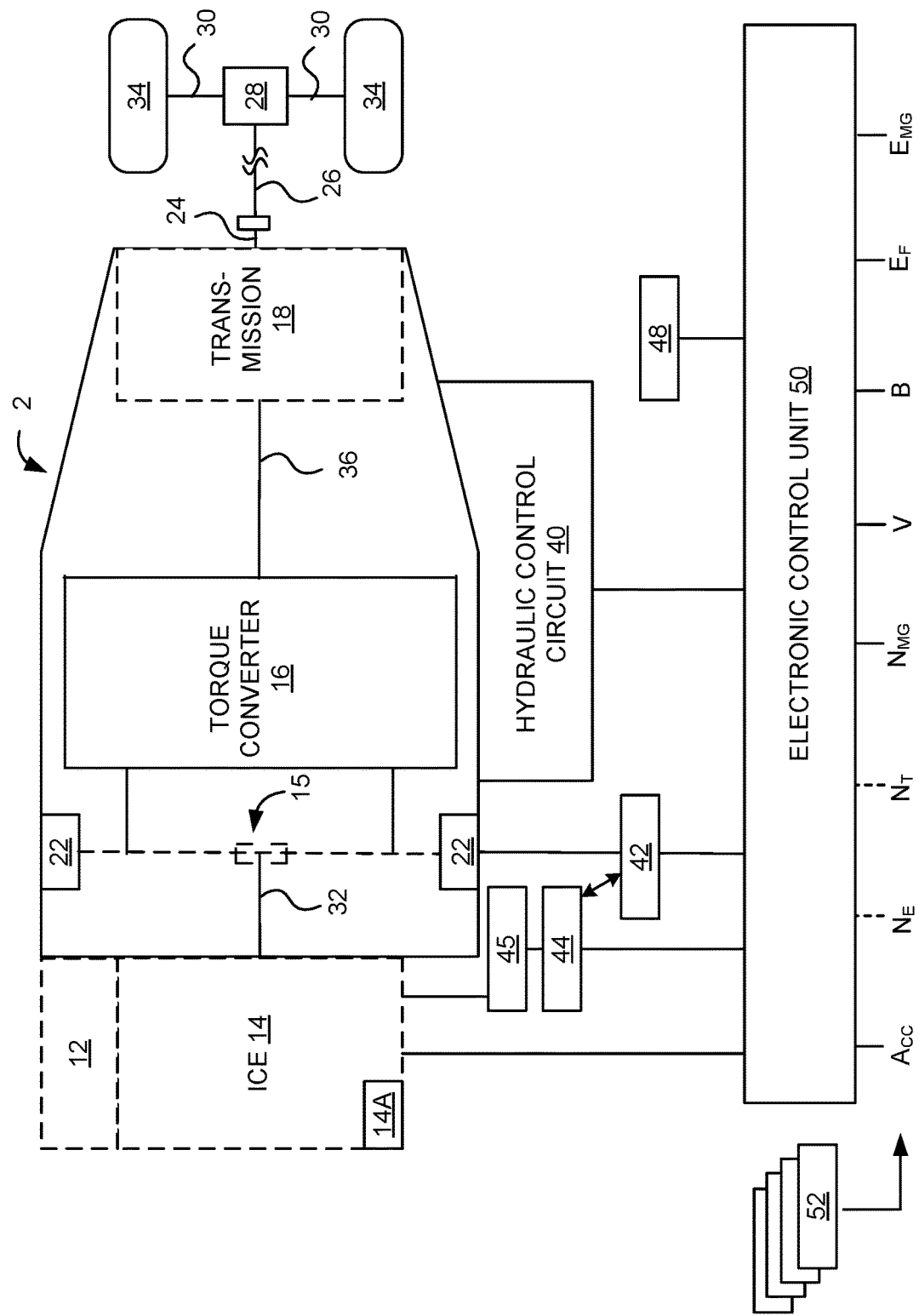
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein can provide control for a creep torque. In various embodiments, systems and methods are provided that facilitate controllably moving a vehicle at low speeds. In various embodiments, the creep-generated-vehicle-speed is the speed the vehicle travels when the creep torque is applied. When uncontrolled, the creep torque may be relatively constant, but different terrain may present a different degree of resistance, causing the creep-generated-vehicle-speed to change. For example, if uncontrolled, the creep-generated-vehicle-speed may decrease with increasing resistance and increase with decreasing resistance. A control system is provided that may increase the creep torque to overcome the environmental impact so that the driver can control the vehicle speed with the brake only (e.g., while hooking up a trailer to the vehicle). In various embodiments, a system and method are provided that facilitate controllably hooking up a vehicle (e.g., a truck) to a trailer. Although this specification may at times focus on traveling in reverse and may at time focus on hooking a trailer to a truck, the methods/ systems of this application are applicable to any situation in which the driver may want to control vehicle speed using the creep torque. Also, the methods/systems of this application are applicable to any situation in which the driver is attempting to travel at close to the creep-generated-vehicle-speed. In other words, although the discussion in this specification at times focuses on the trailer mass and the hooking up of a trailer to a vehicle, the disclosed technology is not limited to this application.

In various embodiments, "close to" the creep-generated-vehicle-speed means within 100% of the creep-generated-vehicle-speed. In various embodiments, "close to" the creep-generated-vehicle-speed means within 100%, within 95%, within 90%, within 85%, within 80%, within 75%, within 70%, within 65%, within 60%, within 55%, within 50%, within 45%, within 40%, within 35%, within 30%, within 25%, within 20%, within 15%, within 10%, or within 5% of the creep-generated-vehicle-speed. Any of these definitions for, "close to" the creep-generated-vehicle-speed may be substituted for the term "close to the creep-generated-vehicle-speed" in any location to obtain different embodiments.

Creep torque is the phenomenon in which the vehicle continues to apply a torque after the driver releases the accelerator, causing the vehicle to move or accelerate when the driver is no longer actively trying to accelerate. In other words, the term creep torque refers to the torque that the vehicle applies towards locomotion when the vehicle is idling. The term idle torque is another term for creep torque, and these two terms may be used interchangeably herein.

Some environmental conditions may cause the driver to use the accelerator to move the vehicle, rather than relying on the creep torque. Some examples of such environmental conditions are increased friction presented by dirt/gravel lots, an uphill grade, or other environmental factors that the default creep torque may have difficulties overcoming. For example, in a parking lot, the pavement may be uneven or there may be other small objects (e.g., mounds of dirt, pebbles, or gravel) that increase the rolling resistance of the vehicle. Those obstacles may be just enough (if the driver is attempting to move at a low speed) to cause the vehicle to stop moving unless the accelerator is applied. In other words, the resistance presented by the obstacle may be greater than the motive power provided by the creep torque. When faced with an obstacle, the driver may need to apply the accelerator to cause the vehicle to move, to continue moving, or to move at a desired speed. However, as soon as the obstacle is passed (e.g., the vehicle drives over the mound of dirt), the resistance decreases. The decreased resistance may cause the vehicle to lurch in a direction of travel or accelerate unexpectedly.

An example of one situation in which creep torque may cause issues for a driver is when hooking up a truck (or another vehicle) to a trailer. A challenging aspect when parking in gravel or while traversing an uphill grade is having to apply the accelerator. For example, while operating the truck in reverse it may be challenging to move the ball of the hitch into the receiver of the hookup. The term "accelerator" may refer to a gas pedal, accelerator pedal, accelerator button, accelerator lever, or other control over acceleration.

To deal with creep torque, drivers often find it convenient or necessary to drive with both pedals. Sometimes both pedals are used simultaneously. The accelerator is used to ensure that the vehicle continues to move in a desired direction (e.g., backwards). The brake is used with the accelerator to ensure that vehicle does not lurch or speed up unexpectedly. The desired direction could be forwards or backwards. In various embodiments, a control system may be provided that relieves the driver of the need for two-pedal driving. In various embodiments, a control system may be provided that automatically controls creep torque in environments of varying resistance. In various embodiments, a control system may automatically control the creep-generated-vehicle-speed to avoid situations where the vehicle lurches in a direction of travel, as a result of the creep torque.

When operating a vehicle in reverse, the creep control system may account for all conditions—not just obtaining a low speed with fine precision control on flat ground when the vehicle is unloaded. For example, the system may also need to account for backing up into a space with a 10,000 lb trailer. The creep control system may use logic to control the creep by controlling the torque that creates the creep. Logic may refer to circuitry, hardware, firmware, or software that performs a task. In various embodiments, the same creep control system may be used for backing up into a space or hooking a trailer to a vehicle. In some embodiments, this specification assumes that vehicle speed can be controlled with brake pressure and the creep-generated-vehicle-speed of the vehicle. This specification further assumes that being able to control the speed by relying on just the brakes and the creep torque often improves the drivability, driver controllability, or driver comfort. When hooking up a truck to a trailer, it can be assumed in some embodiments, that a driver may prefer to use a single pedal to control the reverse speed. It can be assumed that being able to control the vehicle in these situations using only the brake pedal, gives more control to the driver when hooking up a trailer (e.g., when traveling at slow speeds).

For example, when the vehicle is increasing speed towards the creep-generated-vehicle-speed and has a heavy load, the creep torque may cause the opposite to be true. The heavy load tends to exacerbate the need to use a combination of both the brake and the accelerator, but the problem may still be present without the heavy load. In various embodiments, the creep control system is also capable of controlling a vehicle operating in reverse on a hill by compensating for the grade/slope. That grade compensation can be calculated based on the degree of the slope, and the creep control system may overcome the added force of the slope (or any road condition).

In various embodiments, the creep control system has more than just one torque level (or one control) for setting the creep torque. For example, the creep control system may have multiple levels or a range of levels to which the creep torque may be set. It should be understood that creep torque may vary based on the engine load from accessories, such as a trailer, in addition to other factors, such as driver comfort and a target distance. In various embodiments, creep torque is raised to overcome environmental factors, such as differences in road surfaces, gradients, or the vehicle mass (e.g., as a result of a load), In various embodiments, the creep torque may be raised to overcome environmental factors such as road surface, gradients in the road, or the mass of the vehicle. Optionally, the system may also include crawl control logic for off road driving in addition to creep control system for moving in reverse or for moving forward. Optionally, the system may include logic for altering the creep torque during regular driving, so that the creep torque is proportional to the speed or acceleration that the driver is traveling at. Optionally, the system may also include logic for getting the vehicle unstuck from a stuck condition, such as may be caused by mud or ice.

One function of the creep control system is to control the creep torque based on the interaction of the brakes and the torque creep control system to arrive at an acceleration. This way, the driver does not needs to actively use the accelerator. One function may be to control the creep torque based on interactions with the brake and optionally the accelerator (but the accelerator is not required).

The control logic for the creep control system may be initiated based on a user command input or monitoring the vehicle speed while in reverse. The control logic for the creep control system may be initiated based on detecting that a trailer hookup is nearby or within a threshold distance to a position to be attached to the vehicle. For instance, in some embodiments, the creep control system may be initiated when it is detected that the nominal vehicle creep-torque is unable to overcome environmental factors, causing the vehicle to decelerate or stop.

Once the creep control system initiates creep control, the creep torque is continuously ramped up over time. In some instances, the creep torque may be allowed to increase until a maximum creep torque limit is reached. In various embodiments of the creep control system, the increase in the vehicle creep torque towards a maximum vehicle creep torque continues until the brake pedal is temporarily depressed (or the brake is otherwise activated). Once the brake is temporarily depressed, the creep torque at the time of depression (or engagement) is maintained at a constant (e.g., while the creep toque control system continues to operate). In various other embodiments, the torque creep control system may increase or decrease the acceleration in response to an application of the brakes, depending on various input to the creep control system.

In various embodiments there may also be conditions that trigger the creep control system to set a minimum or a maximum value for the creep torque or creep-generated-vehicle-speed, while the creep toque control system continues operation. For example, in some use cases, the driver may engage the brakes or throttle, as the creep torque increases. By increasing the acceleration, the user may set the value of the creep torque to the value that creep torque had at the time of brake actuation, as a constant, maximum, or minimum creep torque. Then, when the accelerator is disengaged, that creep torque is used by the creep control system in continued operations.

For instance, the driver may apply the brakes to set a constant creep torque during the operation of the creep control system, and therefore may prevent any unexpected accelerations. By applying the brakes, the user may set the creep torque or creep acceleration to a constant value. By setting the creep torque or creep acceleration to a constant value, unexpected accelerations may be prevented. By applying the brake, after the brake is released, the vehicle is kept moving by the creep control system with an increasing speed until the creep-generated-vehicle-speed is reached. When the frictional forces effectively create a torque that is close to the applied torque, the applied torque may need to be increased to increase to the speed (and to keep the acceleration constant). To keep the vehicle accelerating, the force driving the vehicle may need to be increased. The applied torque is the torque generated by the engine (or motor), which may be the creep torque, if the accelerator is not applied.

In a scenario where the vehicle is accelerating without applying the accelerator, controlling the value for the creep acceleration may be more effective than controlling the value for creep torque to be constant. Nonetheless, controlling the creep torque may often accomplish a similar result as controlling the acceleration (e.g., as indicated based on speedometer measurements).

Due to the creep torque, the vehicle may be allowed to continue to accelerate until an upper creep-generated-vehicle-speed limit is reached. In other embodiments, the creep control system may continuously monitor one or more input factors to adjust the creep torque to achieve a target speed. The target speed may be a target creep generated speed. For example, the target speed may be 8 kilometers per hour. For instance, if a user is attempting to connect a trailer to the vehicle, the creep control system may automatically adjust the creep torque to achieve a desired speed, based on the distance to the trailer. In various embodiments, the creep torque may be controlled in the process of traveling to another location or may have another target distance, and any place that a target distance is mentioned, the distance between a vehicle and a trailer may be substituted. Also, any place the distance between a vehicle and its trailer is mentioned a target distance, or another target distance, may be substituted to obtain different embodiments.

In various embodiments, the creep control system may be turned off by shifting the vehicle out of reverse or through other user controls. In various embodiments, in which the creep control system is implemented while traveling forwards, the creep control system may be turned off by shifting out of moving forwards. More generally, if the creep control system is implemented for use while the shift of the vehicle is in a particular state, the creep control system may be turned off by exiting that state of the shift. When the creep control system is turned off, the creep torque information and speed information that was learned or the creep torque setting or speed setting that was initiated during the previous operation may be cleared. For instance, even if the user set a specific creep torque as a constant during a previous operation (e.g., by applying the brakes), the creep control system would begin the next operation without any of the prior creep torque settings saved. This would mean that the creep torque would no longer be set to a constant value. In various embodiments, the user may be provided with options to determine when the prior creep torque settings are saved.

The creep torque control logic may be activated in any of several ways. The creep torque control logic may be activated intentionally by the driver or automatically. In various embodiments, a button, or other switch, may be provided that activates the creep torque control logic. The switch may be a dedicated switch that is dedicated switch to activating the logic.

Alternatively or additionally, the creep control system may monitor the speed while in reverse, and automatically turn on when in reverse or during specific conditions. Alternatively or additionally, one or more sensors, such as a camera, may be configured to detect when a ball is within a predefined or defined vicinity of the receiver of the hookup (e.g., within a threshold distance of the hookup). The creep control system may automatically turn on when a situation is detected in which controlling the creep torque may be useful. Alternatively or additionally, one or more sensors may be configured to detect other conditions in which reverse creep torque may play a significant role. Optionally, once activated, the creep control system may display a message indicating that the creep control system has been activated or other information about the activity of the creep torque control may be displayed. For example, the message, "Creep Compensation Active Engine Speed may vary" may be displayed, so as to not alarm the driver if the engine speed is changing, even though the driver's action did not cause the change in speed.

In various embodiments, the creep control system may be useful in situations in which the speed of travel is low enough that the terrain of a parking lot or the size of the load may create issues hindering movement. In various embodiments, the systems of this specification may be applied (e.g., automatically) to situations in which there is a fixed target distance to travel (e.g., at low speeds), such as when backing up into a spot (or when pulling forward into a spot).

In this specification, the "calibration" refers to the minimum speed and acceleration to enter the creep torque control logic. In various examples, the creep torque may be increased from 20 Nm to 65 Nm and the creep acceleration may be increased between 0.1 m/sec$^2$ and 1 m/sec$^2$, between 0.2 m/sec$^2$ and 8 m/sec$^2$, 0.25 m/sec$^2$ and 0.75 m/sec$^2$ or between 0.3 m/sec$^2$ and 0.7 m/sec$^2$. In various examples, the target creep-generated-vehicle-speed may be 5 kmph, 8 kmph, or anything between 5 to 8 kmph, or between 4 to 9 kmph. In various embodiments, the saturation (or maximum) creep-generated-vehicle-speed, the target speed should be the same, whether or not the vehicle is on level ground or is carrying a load. In various embodiments, the system is configured so that there is not any difference in the way the vehicle behaves that is noticeable to the driver that is caused by the terrain or the load. The rate of increase of the input torque may be kept proportional to the rate for increasing speed, via feedback control, until the maximum creep-generated-vehicle-speed is reached.

In various embodiments, the control logic functions well even when just relying on the driver applying the brake or the driver applying the accelerator as input for making decisions. Nonetheless, in various embodiments, a feedback indicating when the vehicle has traveled to the end of the target distance or has traveled to a target location may optionally be included. This feedback may be used to decrease the acceleration or to slow down the vehicle prior to stopping at the target destination. For example, feedback may be provided indicating when the vehicle has reached the point where the ball and receiver are aligned for hooking up or are within a threshold distance of being aligned for hooking up.

In various embodiments, when the accelerator is engaged, the current creep torque level is held constant until after the accelerator pedal is released. If the speed is below the maximum target creep-generated-vehicle-speed, the speed (and or torque) will continue to increase once the accelerator pedal returns to 0% depressed (or, more generally, once the accelerator is no longer being engaged). In various embodiments, while the accelerator is engaged, the torque is controlled by the accelerator-torque relationship with optionally a minimal guard preventing creep torque level (or creep-generated-vehicle-speed) from exceeding a desired value.

In various embodiments, a hold command for torque (which holds the input torque constant) is set so as to be applied when the brake is applied. The hold command holds the acceleration constant, thereby allowing the driver to control the speed using only the brake. The application of the brake is interpreted as a driver-issued command to limit acceleration (because the driver is trying to slowdown the vehicle). To reach and maintain the maximum creep-generated-vehicle-speed feedback control is employed, and the input torque during the feedback control may be based on the road conditions. In various embodiments, the hold command is always issued after applying the brakes, so that when the brakes are released the acceleration will be the acceleration that was obtained just prior to the brakes being applied.

FIG. 1 is an example vehicle within which the invention may be implemented.

The systems and methods disclosed herein may be implemented with any of a number of different vehicles and vehicle types. For example, the systems and methods disclosed herein may be used with automobiles, trucks, motorcycles, recreational vehicles and other like on-road or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for controlling reverse creep torque can be implemented in other types of vehicle including gasoline- or diesel-powered vehicles, fuel-cell vehicles, electric vehicles, or other vehicles. In various embodiments, creep control is used as a method of maneuvering the vehicle to a location, as opposed to merely keeping the vehicle from rolling backwards when on a hill. In various embodiments, the torque input or acceleration for the creep control is set to the torque input or acceleration of the system just prior to engaging the brake or accelerator, as opposed to being proportional to the acceleration when the driver last accelerated.

FIG. 1 illustrates a drive system of a vehicle 2 that may include an internal combustion engine 14 and one or more electric motors 22 (which may also serve as generators) as sources of motive power. Driving force generated by the internal combustion engine 14 or motors 22 can be transmitted to one or more wheels 34 via a torque converter 16, a transmission 18, a differential gear device 28, and a pair of axles 30. Motors 22 are optional—vehicle 2 may be a combustion engine vehicle. Similarly, combustion engine 14 is optional—vehicle 2 may be an all-electric vehicle. Optionally, in parallel with the battery may be one or more fuel cells powering motors 22.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 2 relies on the motive force generated at least by internal combustion engine 14, and a clutch 15 may be included to engage engine 14. In the EV travel mode, vehicle 2 is powered by the motive force generated by motor 22, while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 (or any fuel cells) such as, for example, by removing excess heat from engine 14. For example, cooling system 12 can be implemented with a radiator, a water pump, and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current, such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices. Battery 44 may be charged by a battery charger 45 that receives energy from internal combustion engine 14 (or a fuel cell). For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and braking. As a more particular example, output torque of the motor 22 can be increased or decreased by electronic control unit 50 through the inverter 42. Electrical control unit 50 may implement an algorithm for controlling creep torque in general or for controlling reverse creep torque.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16, via clutch 15. Clutch 15 can be implemented as, for example, a multiple disc type hydraulic frictional engagement device whose engagement is controlled by an actuator, such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16.

Vehicle 2 may include memory 48, which may store instructions that are implemented by electronic control unit 50 (alluded to above). Memory 48 may store instructions for controlling creep torque. Electronic control unit 50 may include circuitry to control various aspects of the vehicle operation. Electronic control unit 50 may include, for example, a microcomputer that includes one or more processing units (e.g., microprocessors), memory storage (e.g., RAM, ROM, etc.) in addition to or instead of memory 48, or I/O devices. The processing units of electronic control unit 50, execute instructions stored in memory (e.g., memory 48) to control one or more electrical systems or subsystems in the vehicle. Electronic control unit 50 can include a plurality of electronic control units such as, for example, an electronic engine control module, a powertrain control module, a transmission control module, a suspension control module, a body control module, the creep torque, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or can be implemented using a single electronic control unit.

In the example illustrated in FIG. 1, electronic control unit 50 receives information from a plurality of sensors included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, creep torque, creep-generated-vehicle-speed, vehicle speed, the state of the shift, or an indication of whether the vehicle is in reverse, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. The image sensors may include a camera. Image sensors can be used to detect, for example, traffic signs indicating a current speed limit, road curvature, obstacles, a receiver of a hitch, target distance to travel, and so on. Sensors 52 may include one or more cameras for detecting the position of the vehicle or for detecting the presence of other objects. For example, sensors 52 may detect when the vehicle is traveling in reverse. As another example, sensors 52 may detect the presence of a trailer and the positioning of the vehicle with respect to the trailer, so as to determine whether the driver is attempting to hook up the vehicle to a trailer. Image sensors may be used to detect whether there is a trailer behind vehicle 2. Image sensors may be used to detect when vehicle is in a position for starting to align a receiver and ball, associated with a trailer and vehicle 2. Image sensors may be used to detect whether the ball and receiver are aligned. Image sensors may be used to detect whether a target location has been reached. Image sensors may be used to detect whether other goals are met for which the creep control system may have been engaged to solve. Still other sensors may include those that can detect road grade or the presence of objects (e.g., a trailer behind vehicle 2). While some sensors can be used to actively detect passive environmental objects, other sensors can be included and used to detect active objects.

The example of FIG. 1 is provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
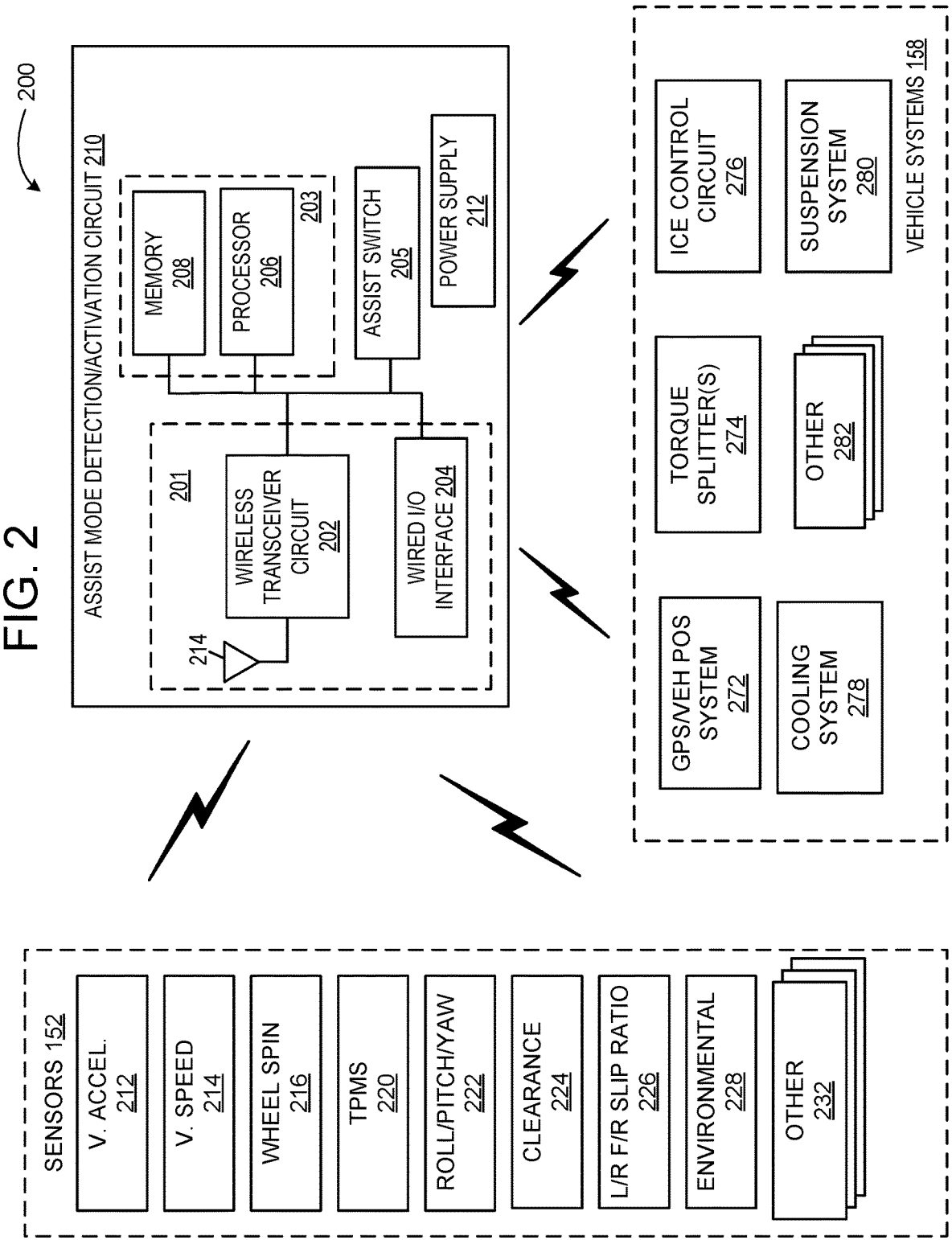
FIG. 2 illustrates an example architecture for controlling creep torque and entering an assist mode (e.g., for controlling reverse creep torque) in accordance with one embodiment of the systems and methods described herein.

FIG. 2 illustrates an example architecture for controlling reverse creep torque and entering an assist mode (e.g., for controlling creep torque) in accordance with one embodiment of the systems and methods described herein. Referring now to FIG. 2, in this example, assist mode detection and activation system 200 includes an assist-mode detection/activation circuit 210, a plurality of sensors 152, and a plurality of vehicle systems 158. Assist mode detection may detect whether activating the creep control system may be beneficial. Sensors 152 and vehicle systems 158 can communicate with assist-mode detection/activation circuit 210 via a wired or wireless communication interface. Although sensors 152 and vehicle systems 158 are depicted as communicating with assist-mode detection/activation circuit 210, they can also communicate with each other as well as with other vehicle systems. Assist-mode detection/activation circuit 210 can be implemented as an ECU or as part of an ECU such as, for example electronic control unit 50. In other embodiments, assist-mode detection/activation circuit 210 can be implemented independently of the ECU.

Assist-mode detection/activation circuit 210 in this example includes a communication circuit 201, a decision circuit (including a processor 206 and memory 208 in this example) and a power supply 212. Components of assist-mode detection/activation circuit 210 are illustrated as communicating with each other via a data bus, although other communication in interfaces can be included. Assist-mode detection/activation circuit 210 in this example also includes a manual assist switch 205 that can be operated by the user to manually select the assist mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory. Memory 208 may be configured to store data and other information as well as operational instructions that may be used by the processor 206 to assist-mode detection/activation circuit 210. Memory 208 may store a maximum creep torque value, which is the maximum that the creep torque is increased to when controlling creep torque. Memory 208 may store an initial creep torque value, which may be a creep torque that is just high enough so that the combustion engine (if present) does not stall. Memory 208 may store the last value for the creep torque just before the driver engaged the brake or accelerator, while the creep torque control was activated.

Although the example of FIG. 2 is illustrated using processor and memory circuitry, as described below with reference to circuits disclosed herein, decision circuit 203 can be implemented utilizing any form of circuitry. For example, decision circuit 203 can be hardware, software, or a combination thereof. By way of further example, one or more processors, controllers, ASICs, PLAs, PALs, CPLDs, FPGAs, logical components, or software routines. Also, other mechanisms might be implemented to make up an assist-mode detection/activation circuit 210.

Communication circuit 201 may include either or both a wireless transceiver circuit 202 with an associated antenna 214 and a wired I/O interface 204 with an associated hardwired data port (not illustrated). As this example illustrates, communications with assist-mode detection/activation circuit 210 can include either or both wired and wireless communications circuits 201. Wireless transceiver circuit 202 can include a transmitter and a receiver (not shown) to allow wireless communications via any of a number of communication protocols. Some examples of communications protocols that may be used include WiFi, Bluetooth, near field communications (NFC), Zigbee, and any of a number of other wireless communication protocols. The protocols may be standardized, proprietary, open, point-to-point, networked, or otherwise implemented. Antenna 214 is coupled to wireless transceiver circuit 202. Antenna 214 may be used by wireless transceiver circuit 202 to transmit radio signals wirelessly to wireless equipment with which it is connected and to receive radio signals as well. These RF signals can include information of almost any sort that is sent to, or received by, assist-mode detection/activation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries, such as, e.g., Li-ion, Li-Polymer, NiMH, NiCd, NiZn, and NiH$_2$, to name a few, whether rechargeable or primary batteries. Power supply 210 can include a power connector (e.g., to connect to vehicle supplied power, etc.), an energy harvester (e.g., solar cells, piezoelectric system, etc.), or it can include any other suitable power supply. Power supply 210 may include one or more fuel cells, in addition to or instead the batteries. The fuels cells may be electrically in parallel with the batteries or in series with the batteries.

Sensors 152 can include, for example, sensors 52 such as those described above with reference to the example of FIG. 1. Sensors 52 can include additional sensors that may or may not otherwise be included on a standard vehicle 2 with which the turn assist-mode system 200 is implemented. In the illustrated example, sensors 152 include vehicle acceleration sensors 212, vehicle speed sensors 214, wheelspin sensors 216. The wheel spin sensor may include one for each wheel. Sensors 152 may include a tire pressure monitoring system (TPMS) 220, accelerometers such as a 3-axis accelerometer 222 to detect roll, pitch and yaw of the vehicle, or vehicle clearance sensors 224. The tire pressure, roll, pitch, and yaw may affect the desired creep torque. For example, roll, pitch, and yaw may indicate a nature of an incline of the vehicle, and the creep torque needed to compensate for the incline. Vehicle clearance sensors 224 may be useful in determining the distance to a trailer to which vehicle 2 is being hooked up. Sensors 152 may include left-right and front-rear slip ratio sensors 226 (which may be expected to affect the future speed of the vehicle). Sensors 152 may include environmental sensors 228 (e.g., to detect salinity or other environmental conditions). Environmental sensors 228 may be useful in determining the state of the vehicle or for better control of the vehicle and creep torque (e.g., when trying to move in reverse in snowy conditions). Additional sensors 232 can also be included as may be appropriate for a given implementation of assist-mode system 200.

Vehicle systems 158 can include any of a number of different vehicle components or subsystems used to control or monitor various aspects of the vehicle and its performance. In this example, the vehicle systems 158 include a GPS or other vehicle positioning system 272. The vehicle systems 158 may include torque splitters 274 can control distribution of power among the vehicle wheels such as, for example, by controlling front/rear and left/right torque split. The vehicle systems 158 may include engine control circuits 276 to control the operation of engine (e.g. Internal combustion engine 14). The vehicle systems 158 may include cooling systems 278 to provide cooling for the motors, power electronics, the engine, or other vehicle systems. The vehicle systems 158 may include suspension system 280 such as, for example, an adjustable-height air suspension system, and other vehicle systems.

During operation, assist mode detection/activation circuit 210 can receive information from various vehicle sensors to determine whether the assist mode should be activated. Also, the driver may manually activate the assist mode by operating assists switch 205. Communication circuit 201 can be used to transmit and receive information between assist-mode detection/activation circuit 210 and sensors 152, and assist-mode detection/activation circuit 210, and vehicle systems 158. Also, sensors 152 may communicate with vehicle systems 158 directly or indirectly (e.g., via communication circuit 201 or otherwise).

In various embodiments, the assist mode for controlling creep torque can be activated either automatically or manually. In various embodiments, the assist mode may behave somewhat differently depending on whether the assist mode was activated automatically or manually. For example, if the assist mode was implemented automatically, the creep-generated-vehicle-speed may be increased at a slower rate or the maximum creep-generated-vehicle-speed may be set to a lower value as compared to when the assist mode is activated manually. When the assist mode is activated manually, the driver is more likely to expect vehicle 2 to increase the creep-generated-vehicle-speed or is more likely to expect vehicle 2 to accelerate without the driver activating the accelerator. Therefore, when the assist mode is activated manually, the driver is less likely to be surprised or feel uncomfortable as a result of the increase in the creep-generated-vehicle-speed or the acceleration of vehicle 2.

In various embodiments, communication circuit 201 can be configured to receive data and other information from sensors 152 that is used in determining whether to activate the assist mode. Additionally, communication circuit 201 can be used to send an activation signal or other activation information to various vehicle systems 158 as part of entering the assist mode. For example, as described in more detail below, communication circuit 201 can be used to send signals to, for example, one or more of: torque splitters 274 to control front/rear torque split and left/right torque split. Communication circuit 201 can be used to send signals to motor controllers 276 to, for example, control motor torque, motor speed of the various motors in the system. Communication circuit 201 can be used to send signals to ICE control circuit 276 to, for example, control power to engine 14. A decision whether to automatically enter a creep control mode may be based in-part on the environmental conditions, such as the nature of the terrain. Some environmental conditions that determine whether to enter a creep control mode may include whether the vehicle is in a gravel parking lot or whether the vehicle is attempting to travel uphill. The environmental conditions may be determined based in part on information detected by sensors 152 and the location of the vehicle as determined by GPS 272.

ICE control system 276 may be used to control the creep-generated-vehicle-speed or the creep torque of the internal combustion engine 12 or motors 22. ICE control system 276 may include a creep control system instead of, or in addition to, the creep control system that may be run by processor 206 or ECU 50. ICE control system 276 may control the throttle, which may control the minimum amount of fuel or air provided to the combustion engine to keep the vehicle moving without the driver engaging the brakes or accelerator. Similarly, ICE control system 276 may control a solenoid that controls the minimum amount of power the battery 44 supplies the motor. This minimum amount of power may keep the vehicle moving, via the motor, while the driver is not engaging the brakes or accelerator. Optionally, when an engagement of the accelerator is detected, in response to the detecting of the engagement of the accelerator, a minimum acceleration may be set. The minimum acceleration may be the vehicle acceleration just prior to the detecting of the engagement of the accelerator. Also, ICE control system 276 may control the transmission to help decrease the acceleration, or control braking of vehicle 2 during the creep control mode. Vehicle systems 158 may also include other system 282.

Figure 3:
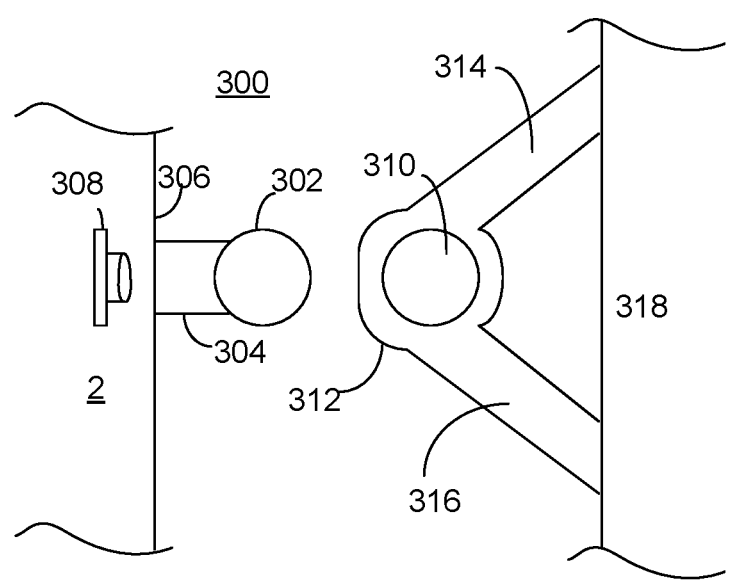
FIG. 3 illustrates an example of a hookup system between the vehicle of FIG. 1 and a trailer.

FIG. 3 illustrates a hookup system 300 between vehicle 2 and a trailer for hitching vehicle 2 to a trailer. Hookup system 300 may include ball 302 having support 304, which is attached to the rear section 306 of vehicle 2. The rear section 302 of the vehicle may include a camera 308, optical sensors, or other sensors. Hookup system 300 may also include receiver 310, which may be an opening or hole in ring 312 into which ball 302 engages, which in-turn may be supported by arms 314 and 316. Arms 314 and 316 may be attached to the front portion of trailer 318. FIG. 3 just illustrates one example of a hookup system for hitching a vehicle to a trailer. Many other hookup systems or hitches may be used instead of the system of FIG. 3.

Figure 4:
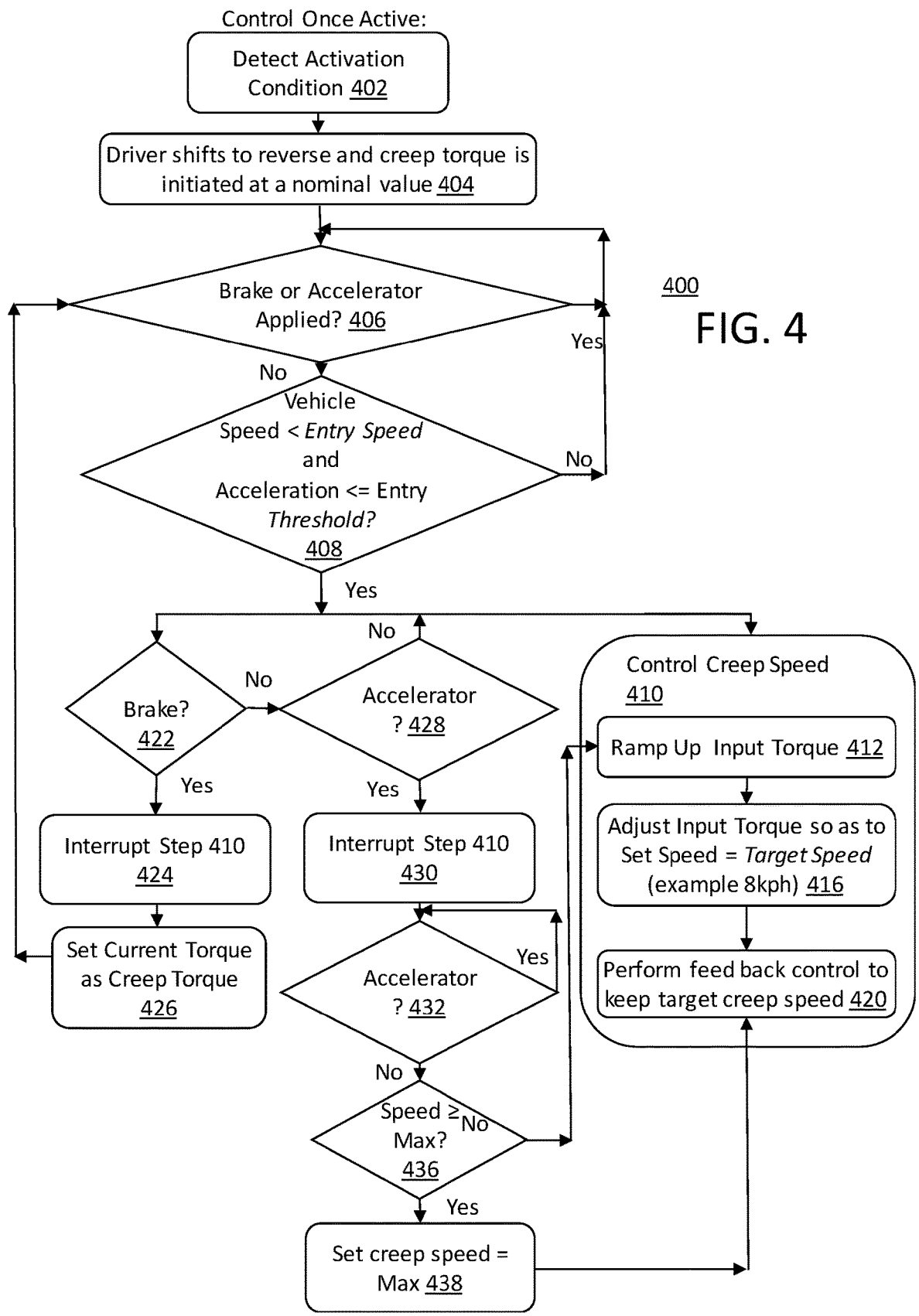
FIG. 4 illustrates a flowchart of an example method of controlling creep torque.

FIG. 4 illustrates a flowchart of an example of method 400 of controlling creep torque. In optional step 402, a determination is made whether the creep control system has been activated. If creep control system has been activated, the rest of the method 400 is implemented. Step 402 may include determining whether or not the driver pressed a button requesting the creep control system to be activated or determining the speed or acceleration of vehicle 2. Step 402 may include determining whether or not vehicle 2 is in reverse or determining whether there is a trailer behind vehicle 2. Step 402 may include determining whether or not vehicle 2 is in position to hook up to trailer 318, is in another preestablished configuration, or is in a preestablished condition in which creep torque is useful for maneuvering the vehicle.

If the creep control system has not been activated, the creep control system waits until the creep control system has been activated. Once the creep control system is activated, method 400 proceeds to step 404.

In step 404, a determination is made whether vehicle 2 is in reverse. If vehicle 2 is not in reverse, the method 400 returns to step 404. If vehicle 2 is in reverse, method 400 proceeds to the next step (e.g., step 406). In various other embodiments step 404 may precede step 402. In other embodiments in which the creep torque control is used for traveling forwards, step 404 may check whether vehicle is in a forward gear instead of checking whether vehicle 2 is in reverse.

In step 406, the creep control system checks whether the accelerator is engaged or whether the brake is engaged. If the accelerator or brake is engaged, the creep torque control is not activated, and method returns to step 406. In effect, the returning to step 406 causes creep control system to wait until both the accelerator and brake are not engaged. If the accelerator and brake are not engaged, the creep torque control system is activated, and system proceeds to step 408.

In step 408, a determination is made whether the speed is less than an entry speed. For example, the entry speed may be 3 kilometers per hour. Also, a determination is made whether the acceleration is less than the target acceleration creep. If at least one of these two conditions are not met, the vehicle is assumed to be moving at an adequate speed or acceleration and the method returns to step 406. That is, if the speed is greater than the entry speed or the acceleration is greater than the maximum acceleration creep, then the vehicle is assumed to be moving at an adequate speed. Consequently, the creep torque control logic is not implemented, and the method returns to step 406. Throughout this specification the terms maximum, saturation, and target are used interchangeably (because the maximums are usually targets that should not be exceeded), and each term may be substituted for the other to obtain different embodiments. By contrast, if both conditions are met, then the vehicle is assumed to not be moving or to be moving too slowly, and the creep torque control logic is implemented, starting in step 410.

It is noted, however, that even when the creep control logic is implemented, vehicle 2 is not really necessarily stuck, in the sense that there may not necessarily be any wheel slippage, and it may be that the driver would have absolutely no problem getting the vehicle moving using the accelerator, if the driver wanted to. The vehicle may in fact be moving. The issue may merely be that it is difficult for the driver to drive vehicle 2 at a slow enough speed without lurching or without bumping into a nearby obstacle. The issue may merely be that it is difficult for the driver to drive vehicle 2 at a slow enough speed without damaging the hookup of trailer that the driver is attempting to hook up to vehicle 2, without a jerky motion, or without overshooting a desired location. Similarly, the issue may be merely that it is difficult for the driver to keep the vehicle moving, but at a relatively slow speed that is appropriate for the current situation or location. For example, the location may be a parking lot or an area with pedestrians walking nearby the vehicle.

Next, in step 410, the creep control system automatically takes control of the creep-generated-vehicle-speed. In sub-step 412, the input torque is increased enough to increase the acceleration of the movement of vehicle 2. The creep control system continues to increase the acceleration of the vehicle (by increasing the creep torque) until a threshold speed is reached or until a maximum acceleration is reached. If the maximum acceleration is reached prior to reaching the threshold speed, the acceleration may be held constant or may be held at the maximum acceleration until the threshold speed is reached. For example, the reverse speed saturation (or maximum speed) may be at about 5 kph. Consequently, when the brakes and accelerator are not engaged, the maximum creep-generated-vehicle-speed may be 5 kph.

Determination of Limits on the Input Torque and Ramp Up Rate

The rate at which the torque is increased (the ramp up rate) may be based in-part on the distance needed to travel (e.g., to hook up to vehicle 2 to trailer 318). It may be that the trailer or other target location is too close to vehicle 2 to accelerate to what would otherwise be the maximum acceleration, prior to reaching the target location. The following discussion is related to computing a maximum acceleration when the target location is too close. In various embodiments, the input torque may be a function of time $\tau(t)$ that is chosen to increase gradually. For example, the input function may be chosen to be any monotonically increasing function. Once the vehicle starts moving, the acceleration of the vehicle may be a linear or a roughly linear function $a(\tau)$ of the input torque t from which the input torque needed for a given acceleration can be derived. For example, the acceleration $a(\tau)$ may be approximated by $a(\tau) \approx K_1 \tau - a_f$, where $K_1$ and $a_f$ are phenomena-logically determined constants. The input torque may be chosen to be proportional to the velocity (as long as the direction of travel of the vehicle is a straight line there is no difference between the speed and the velocity). Plugging $\tau(t)$ into $a(\tau)$, one obtains the acceleration as a function of time, $a(\tau)$.

In various embodiments, the way the input torque is increased may be a nonlinear mathematical function of time. In various embodiments, the way the input torque is increased may be a relationship determined by the numerical solutions of various equations, or by an algorithm. In this specification, a "relationship" is more general than a "function." However, wherever a function is referred another relationship may be substituted that is not necessarily a function, and wherever a relationship is referred to, a function may be substituted (to thereby obtain different embodiments).

Using the formula for velocity, v=dx/dt and the formula for acceleration, a=dv/dt=d²x/dt², one can derive (numerically or algebraically) a relationship between the velocity v(t) and time t. Using these formula, one can also derive a relationship between position x(t) and time. Here, dx/dt is the derivative of the position with respect to time, dv/dt is the derivative of the velocity with respect to time and d²x/dt² is the double derivative of time with respect to time. From the relationship between the velocity v(t) and time t one can further derive a relationship between acceleration and velocity, a(v), and between acceleration and position, a(x). One can then set the maximum acceleration, using the function a(x), to the lower of the acceleration reached at target distance and the maximum acceleration that is based on the comfort or expectations of the driver.

The position at which the maximum velocity will be reached may depend on the maximum velocity and input torque. The position at which the maximum velocity will be reached may also depend on what maximum velocities or accelerations are likely to feel comfortable to the driver. By choosing the function for increasing the torque, one can determine the position that the maximum speed is reached. If the torque is increased linearly with distance, the speed is proportional to the square of the time over which the acceleration is increased.

As an example, if the torque is increased linearly with time, the acceleration function $a(\tau)$ will have the from with $a=K_2 t+a_0$, where $a_0$ is the initial acceleration of the vehicle (which may be 0) and $K_2$ is another constant. This example is chosen for its simplicity. As a digression, if the acceleration is kept proportional to the velocity, the acceleration is an exponential function, and if the acceleration is chosen to be a sum of cosines, sines, hyperbolic cosines, or hyperbolic sines, the acceleration can be proportional the distance traveled. Returning to the example in which the acceleration is a linear function of time, the velocity is given by $v(t)=K_2 t^2/2+a_0 t+v_0$, where $v_0$ is the initial velocity. Similarly, integrating v(t) with respect to time t, one can derive the position x(t) as a function of time. One can then solve for time t(v) as a function of the velocity v(t), and for time t(a) as a function of the acceleration $a(\tau)$. The acceleration as a function the velocity may then by arrived at by pugging the expression for time as function of velocity, t(v), into the acceleration as a function of time, $a(\tau)$ to arrive at a(v)=(a(t(v)). Similarly, from the expression for position as function of time x(t), one may derive an expression for time as a function of position t(x). This expression may be plugged into the expression for acceleration as a function of time to arrive at an expression for acceleration as a function of distance a(x)=a(t(x)). For example, for the case of a linear increase in torque with time, from the expression for a(v), in this example, one arrives at $$a_{max}(v_{threshold})=\text{sqrt}((a_0)^2-K_2(v_0-v_{threshold})),$$

where $a_{max}$ is the maximum acceleration and the $v_{threshold}$ is the threshold velocity. One can then check the target location to see whether the vehicle will reach the target location prior to reaching $a_{max}$. For example, the expression for time as a function of acceleration, t(a), may be plugged into the expression for acceleration as a function of time, or x(a)=x(t(a)). Then using the value for $a_{max}$ as the acceleration, one can compute the distance traveled to reach the maximum acceleration, $x(a_{max})$. Then the value of $x(a_{max})$ may be compared to the distance to the trailer, to determine if there is enough room between vehicle 2 and the trailer to allow the acceleration to increase to $a_{max}$. If there is enough distance to the target location, one may choose the rate of increase of the acceleration, $K_2$. This may be done by choosing the rate of increase of the torque input, such that $a_{max}$ is reached prior to reaching the target location, with sufficient time to decrease the acceleration and then decelerate to a stop. In general, however, the rate of increase of the acceleration, $K_2$, may be chosen to be slow enough to keep the driver feeling comfortable.

In various embodiments, the maximum acceleration may be set to the minimum of $a(v_{threshold})$, a(d), and $a_m$. Here $a(v_{threshold})$ is the acceleration at which the speed reaches the value $v_{threshold}$. Also, a(d) is the acceleration reached after traveling a distance d that is less than or equal to the target distance and $a_m$ is a defined or predetermined value. The acceleration $a_m$ may be, or may be the minimum of, a maximum acceleration that is considered comfortable to the driver and the maximum acceleration that is considered to be safe in the current conditions that the vehicle detected. The maximum value that is considered comfortable may be a maximum acceleration that an average driver would be comfortable with or a maximum acceleration that the current diver is comfortable with. The maximum acceleration with which the current driver is comfortable may be determined based on input from the driver or by monitoring the driver's driving habits. In various embodiments, the defined values that may be used for $a_m$ may be, between 0.1 m/sec² and 1 m/sec² or between 0.25 m/sec² and 0.75 m/sec², for example.

If the vehicle will reach the trailer or other target location prior to reaching $a_{max}$ and if there is not enough distance to accelerate to $a_{max}$ and then stop, while avoiding operating the vehicle in a manner that is unsafe or that may make the driver feel uncomfortable, then one may want to set $a_{max}=a(d)$. The distance d may be a location that is greater than or equal to halfway between vehicle 2 and the target location. The distance d may be a distance that provides enough room to stop vehicle 2. The distance d may be a distance that provides enough room to decelerate and stop smoothly upon reaching the target location. The target location may be the point where ball 302 is in, or under, the receiver (e.g., receiver 310).

In various embodiments, the relationships x(t), v(t), $a(\tau)$, t(x), t(v), t(a), a(v), a(x), or x(a), may be arrived at numerically (e.g., and optionally stored as lookup tables). In various embodiments, it may not be necessary to determine both relationships a(x) and x(a) (e.g., one of the two relationships may be adequate). Also, there may be no need to derive, or to expressly derive, a relationship for x(t), v(t), $a(\tau)$, t(x), t(v), or t(a). In other embodiments, the maximum acceleration may be determined in an entirely different manner.

In step 412, in various embodiments, a determination is made whether the torque is above a maximum or whether the acceleration of the vehicle is above a maximum value. If the acceleration or torque is above the maximum, the torque is decreased enough to decrease the acceleration. Alternatively, the acceleration may be kept at or below a maximum in another way.

In substep 416 of step 410, the acceleration or input torque is decreased, as the speed increases from the threshold speed to the target creep-generated-vehicle-speed. The acceleration may be increased so as to arrive at a target creep-generated-vehicle-speed in a gentler manner than had vehicle 2 continued to increase its accelerated. The acceleration may be increased so as to arrive at a target creep-generated-vehicle-speed in a gentler manner than were the vehicle 2's acceleration kept at the maximum acceleration. The rate of decrease of the acceleration may be linear with time until the target speed is reached. After the target speed is reached, the creep control system may switch to feedback control to maintain the target speed. Alternatively, the rate of decrease of speed may be a smooth curve that smoothly decreases to zero so as to arrive at zero acceleration when arriving at the target speed. Alternatively, the decrease in acceleration may have different relationship to time. Step 416 is optional.

In substep 420 of step 410, feedback control is performed to ensure that the target speed is maintained. During step 420, the acceleration of vehicle 2 may be kept at zero, at near zero, at an average acceleration of zero, or at near an average acceleration of zero. For example, during step 420, vehicle 2 may accelerate in response to vehicle 2's speed dropping below a lower threshold that is lower than the target creep-generated-vehicle-speed (thereby increasing the speed). Similarly, during step 420, vehicle 2 may decelerate in response to the speed increasing above a threshold that is higher than the target speed. At the beginning of step 420, there may be a sudden drop in the vehicle acceleration between the acceleration last used to obtain the target creep-generated-vehicle-speed and 0 acceleration. Alternatively, at the beginning of step 420, there may be a gradual drop in the vehicle acceleration between the acceleration last used to obtain the target creep-generated-vehicle-speed and 0 acceleration. Optionally, a check is performed to see whether the brake or accelerator is applied during, before, or after each of steps 416 and 420, and if the brake or accelerator is applied, steps 416 or 420 are ended.

Returning to step 408, after step 408, method 400 may also proceed to step 422. Step 422 may be performed simultaneously, while step 410 is being performed.

In step 422, a determination is made whether either the brake or the accelerator was engaged. If the brake and accelerator were not engaged, the method 422 returns to step 422 and again checks whether the brake or accelerator were engaged. If during step 422, it is determined that the brake or accelerator were engaged, method 400 proceeds to step 424. Effectively, in an embodiment, system 400 waits until the brakes have been engaged, and once the brakes are engaged, the creep control system proceeds to step 424. As a result of step 422, during steps 412, 416 or 420, if either the brake or the accelerator have been applied, method 400 proceeds to step 424.

In step 424, vehicle 2 interrupts step 410 and the increasing of the input torque or vehicle acceleration is stopped. When the brake or accelerator are engaged, the speed of vehicle 2 is controlled by driver input or input from the brake or accelerator. After step 424, the method proceeds to step 426.

During step 426, the current creep torque is set as a fixed value or the acceleration is set to a constant value (e.g., by setting a fixed value for the input torque or by setting a fixed value for the acceleration of the vehicle). By setting the current creep torque to the prior creep torque, method 400 learns, based on the driver behavior or a lower boundary for an appropriate creep torque. After step 426, the method returns to step 406. As a result of steps 424 or 426, the driver can control the creep acceleration (or the input torque) using just the brakes (without using the accelerator). Step 426 may be performed prior to, concurrently with, or after step 424.

Returning to step 422, if it is determined that the brake is not engaged, method 400 may proceed to step 428 to determine whether the accelerator has been engaged. If in step 428, it is determined that the accelerator is not engaged, method 400 may return to step 422. Alternatively, method 400 may first check whether the accelerator is engaged, and then if the accelerator is not engaged, method 400 checks whether the brake is engaged. Alternatively, steps 422 and 428 may be performed independently of one another. Also, a check may be performed to determine whether the accelerator is engaged simultaneously or concurrently while a check is made to determine if the brake was engaged. If in step 428 it is determined that the accelerator was engaged, then method 400 proceeds to step 430. In step 430, the torque ramps up or feedback control are interrupted, which may give the driver direct control over the input torque to thereby control the speed or acceleration of the vehicle. In step 432, a determination is made whether the accelerator is still being engaged. If it is determined that the accelerator is still engaged, method 400 returns to step 432 and again checks whether the accelerator is still engaged. If in step 432 it is determined that the accelerator is no longer engaged, method 400 proceeds to step 434. Effectively, system 400 waits until the accelerator is no longer being engaged and then once the accelerator is no longer being engaged, method 400 proceeds to step 434.

In step 434, method 400 determines whether the current speed is greater than or equal to the target creep-generated-vehicle-speed. If the current speed is greater than or equal to the target creep-generated-vehicle-speed, then method 400 proceeds to step 436. In step 436, the creep-generated-vehicle-speed is set to the target creep-generated-vehicle-speed (for example). After step 436, method 400 proceeds to step 420, so that after the vehicle slows down to the target creep-generated-vehicle-speed, a feedback control is performed to maintain the vehicle speed at the target creep-generated-vehicle-speed. If the current speed is less than the target creep-generated-vehicle-speed, method 400 proceeds to step 420. In step 420, an input torque is applied to bring the vehicle to the target creep-generated-vehicle-speed. Step 420 will check whether the acceleration needs to be increased, or whether the acceleration should be decreased, as the vehicle approaches the target creep-generated-vehicle-speed.

Figure 5:
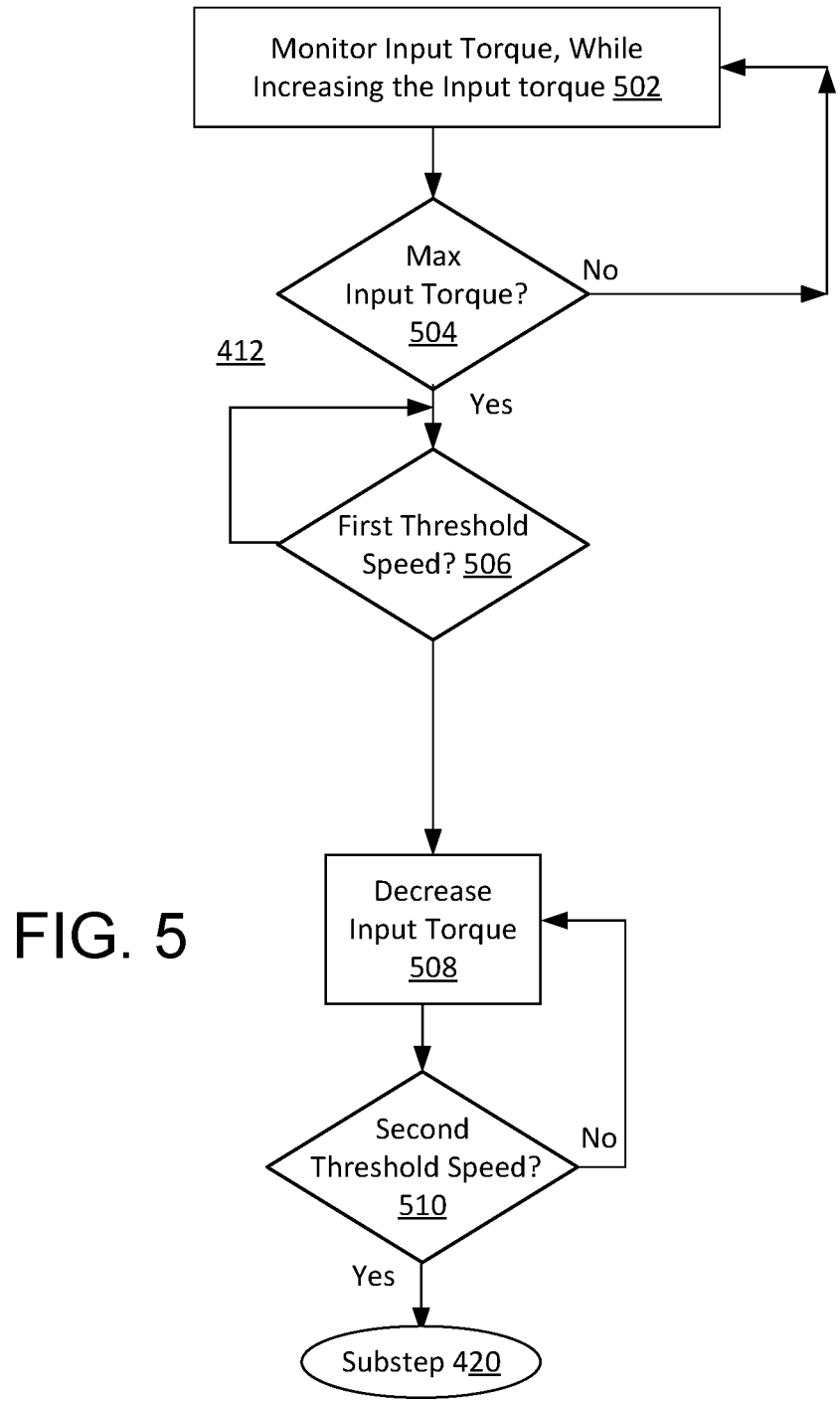
FIG. 5 illustrates a flowchart of an example method of implementing increased creep torque.

FIG. 5 illustrates a flowchart of an example of a method of implementing step 412. In step 502, the input torque or vehicle acceleration are monitored. In step 504, a determination is made whether the maximum input torque or maximum vehicle acceleration has been reached. If the maximum vehicle acceleration or maximum torque has not been reached, method 500 returns to step 502. If the maximum vehicle acceleration or maximum torque has been reached, method 500 proceeds to step 506. In various embodiments or situations, the maximum input torque may be set so that the torque continually increases throughout step 504. In step 506, a determination is made whether a first threshold creep-generated-vehicle-speed has been reached. If it is determined that the first threshold creep-generated-vehicle-speed has not been reached, step 506 returns to step 506 and checks again. If it is determined that the first threshold creep-generated-vehicle-speed has been reached, step 506 proceeds to step 508. During step 506, the vehicle travels at the maximum torque or maximum acceleration. The first threshold creep-generated-vehicle-speed is lower than the target creep-generated-vehicle-speed. Also, the first threshold creep-generated-vehicle-speed may be chosen so that there is enough time to decrease the acceleration prior to reaching the threshold creep-generated-vehicle-speed.

This may ensure a smooth transition between accelerating and traveling at a constant speed.

In various other embodiments or situations, the maximum input torque may be reached during step 506. After the maximum input torque is reached the input torque is kept constant until a threshold speed is reached that is optionally less than, but which may be relatively close to, the target creep-generated-vehicle-speed.

In step 508, the input torque or vehicle acceleration are decreased. However, during step 508, vehicle 2 is still accelerating and there is still an input torque being applied to move the vehicle in the same direction as in step 506. Although, during step 508, there is less vehicle acceleration than in step 506, since vehicle 2 continues to accelerate, the speed of vehicle 2 may continue to increase. The rate of decease in the input torque or vehicle acceleration may be determined so as to facilitate a smooth transition between increasing the vehicle speed and keeping speed of vehicle 2 constant.

In step 510, a determination is made whether a second threshold speed has been reached. The second threshold speed of step 510 may be different and may be greater than the first threshold speed used to determine the maximum acceleration. The second threshold speed of step 510 may be the target speed or may be a speed close enough to the target speed so as to not require any further change in speed. The second threshold speed of step 510 will be discussed further in conjunction with FIG. 7, below. If the second threshold speed of step 510 has not been reached, method 500 returns to step 510. If the second threshold speed of step 510 has been reached, then method 500 is exited, and method 400 proceeds from step 416 to 420. The monitoring of the input torque or acceleration may be performed throughout method 500.

Method 500 may not expressly account for the possibility that the target destination may be reached prior to reaching the maximum acceleration. Additionally, the maximum acceleration may be reached too close to the target acceleration to stop at the target destination or stop comfortably at the target destination. However, if the maximum acceleration is chosen as described in conjunction with the description of step 412, that possibility is already accounted for. Setting the maximum acceleration to the minimum of $a(v_{threshold})$, $a(d)$, and $a_m$, helps ensure that the maximum acceleration is reached sufficiently prior to the target destination to comfortably stop.

Figure 6:
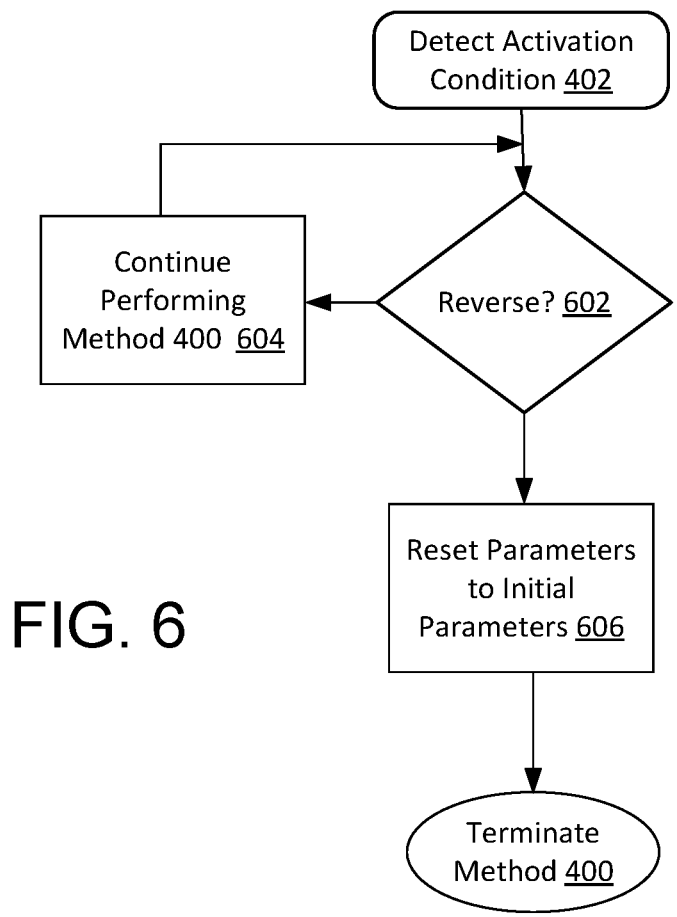
FIG. 6 illustrates a flowchart of an example method for determining whether to exit the example method of FIG. 4.

FIG. 6 illustrates a flowchart of various embodiments of a method 600 for determining whether to exit method 400 and stop controlling the creep torque. Method 600 is performed concurrently with method 400 and determines when to end method 400. In step 602, a determination may be made as to whether input has been received indicating that the driver would like vehicle 2 to stop traveling in reverse. Step 602 may include monitoring for receipt of a signal from the shift of vehicle 2 indicating that vehicle 2 is being taken out of reverse. Optionally, in step 602, a determination that vehicle 2 is no longer in reverse may be triggered by vehicle 2 being placed in neutral or in park. Optionally, in step 602 a determination that vehicle 2 is no longer in reverse may be triggered by cessation of a signal that is transmitted while the vehicle is in reverse (or no longer in the shift state in which the creep control system is engaged). Optionally, in step 602, a determination that vehicle 2 is no longer in reverse may be triggered by a signal that is transmitted when vehicle 2 is switched out of reverse. More generally, in step 602, a determination, that vehicle 2 is no longer in a gear in which the creep control system was intended to be implemented, may be triggered by the shift being placed in a different gear than the one in which creep control system was engaged.

If in step 602, it is determined that vehicle 2 is still in reverse (or still in the shift state in which the creep control system is engaged), method 602 proceeds to step 604. In step 604, method 400 is allowed to continue (thereby continuing to control the creep torque). After step 604, method 600 returns to perform step 602, again checking whether vehicle 2 is still in reverse (or still in the shift state in which the creep control system was engaged). If in step 602, it is determined that vehicle 2 is no longer in the shift state in which the creep control system is engaged, method 602 proceeds to step 606. In step 606, the parameters of the creep control system are reset to their initial values, so that each time method 400 is implemented, method 400 starts in the same manner. After step 606, method 400 is terminated. Alternatively or additionally, a determination may be made whether the vehicle reached a target destination or target condition.

In various embodiments, method 400 may be terminated prior to or while performing step 606. In contrast to method 600, step 424 of method 400 does not end method 400. Also, in various embodiments, whereas step 424 triggers step 426, which has the effect of learning from the driver behavior, the ending of method 600 ends all learning. The ending of method 600 causes method 400 to forget or to stop storing what was learned while performing method 400. If method 400 was implemented to control creep torque while traveling in reverse, removing the shift from a reverse gear may end method 400. If method 400 was implemented to control creep torque while traveling forwards, removing the shift from a forward gear may end method 400. Alternatively or additionally, reaching the target location may also end method 400, causing the creep control system to discard the parameters that were learned while implementing method 400.

Figure 7:
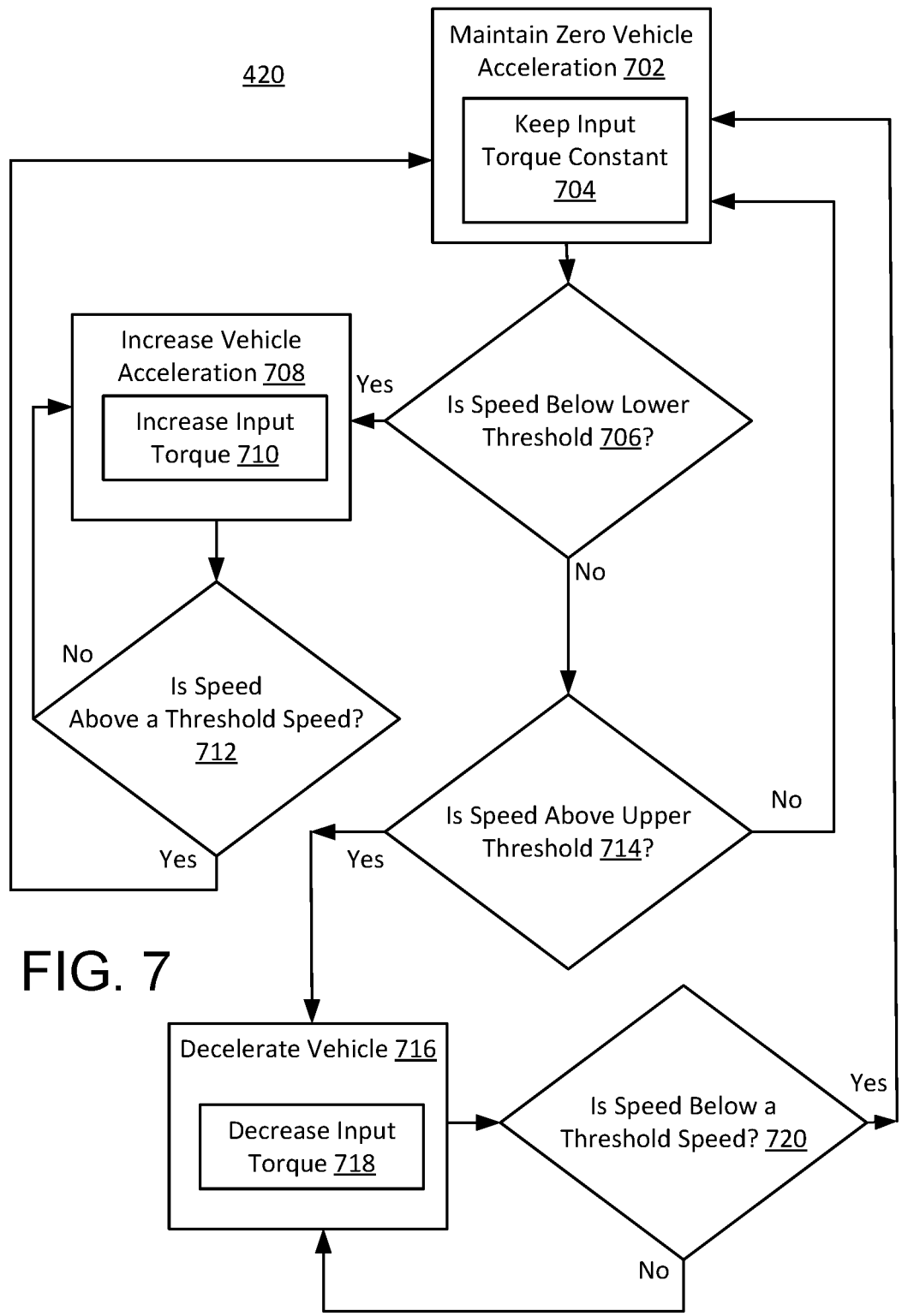
FIG. 7 illustrates a flowchart of an example method of using feedback control to maintain a constant speed.

FIG. 7 illustrates a flowchart of various embodiments of a method of implementing substep 420 of FIG. 4, in which the creep torque is maintained at a constant value by feedback control. Method 700 may maintain a constant speed by keeping the speed between an upper threshold and a lower threshold. Optionally, the threshold of step 510 may be the same as or above the lower threshold of method 700. In various embodiments, the threshold of step 510 may be the between the lower threshold of method 700 and the upper threshold of method 700.

In step 702, the vehicle acceleration is maintained at no acceleration. Step 702 may be implemented by substep 704, which involves keeping the input torque at a constant value. If the input torque is kept at just enough torque so that the force pushing the vehicle forwards is equal to the sum of all the resistive forces that hinder vehicle 2 from moving, then vehicle 2 will retain a constant velocity. Optionally substep 704 may include adjusting the input torque to account for changes in terrain, such as uneven terrain, snow, ice, or changes in the gradient on which vehicle 2 is operating.

In step 706, a determination is made as to whether the speed is below a lower threshold. If the speed is below the lower threshold, method 700 proceeds, to step 708, in which the vehicle 2 is accelerated. Step 708 may involve substep 710, in which the input torque is increased. After substep 710, method 700 proceeds to step 712. In step 712, a determination is made whether the speed is above a threshold speed for ceasing to accelerate. The threshold speed of step 712 for ceasing to accelerate is not necessarily the target speed. The threshold speed of step 712 for ceasing to accelerate may be greater than or equal to the lower threshold of step 706. For example, the threshold speed of step 712 for ceasing to accelerate may be greater than, equal to, or less than the target speed. If the speed of the vehicle 2 is still less than the threshold speed for ceasing to accelerate, method step 420 continues to accelerate vehicle 2. The continued acceleration may be accomplished by maintaining the increased torque (which is a torque greater than the torque needed to match resistive forces that hinder the movement of vehicle 2). If in step 712, the speed is determined to be above the threshold speed for ceasing to accelerate, step 420 returns to step 702, and vehicle 2 ceases to accelerate.

Returning to step 706, in step 706, if the speed is not below the lower threshold, method 700 proceeds to step 714. In step 714, a determination is made as to whether the speed is greater than an upper threshold. If the speed is greater than the upper threshold, step 420 proceeds to step 716, in which vehicle 2 is decelerated. Step 716 may involve substep 718, in which the input torque is decreased. After substep 718, step 420 proceeds to step 720. In step 720, a determination is made whether the speed is below a threshold speed for ceasing to decelerate. The threshold speed of step 720 for ceasing to decelerate is not necessarily the target speed or of the upper threshold of step 714. For example, the threshold speed of step 720 for ceasing to decelerate may be lower than or equal to the upper threshold of step 714, but the threshold speed of step 720 may be greater than, less than, or equal to the target speed.

The threshold speeds for steps 712 and 720 may be between the lower threshold of step 706 and the upper threshold of step 714. If the speed of the vehicle is still greater than the threshold speed for ceasing to decelerate, method step 420 continues to decelerate vehicle 2, by maintaining the decreased torque. The decreased torque of steps 716 and 720 may be a torque less than the torque needed to match resistive forces that hinder the movement of vehicle 2. In step 720, if it is determined that the speed of vehicle 2 is below the threshold speed for ceasing to decelerate, step 420 returns to step 702, and vehicle 2 ceases to decelerate.

Figure 8A:
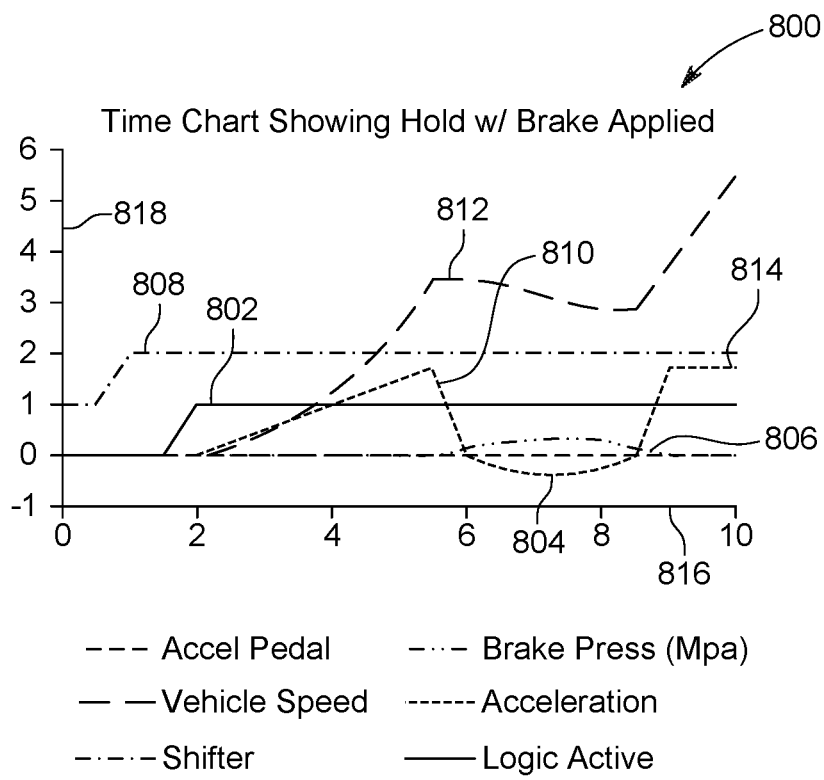
FIG. 8A illustrates an example timing chart of inputs and resulting outputs for controlling creep torque.

FIG. 8A illustrates a plot 800, which is a timing chart of representations of an example of inputs that may be received and the resulting outputs, related to the creep control system. Plot 800 shows a plot 802 indicating when the creep torque control logic is active. Signal 804 may be a signal from the accelerator. In the example of FIGS. 8A and 8C, the accelerator is never engaged, and so plot 804 is at zero on the horizontal axis throughout FIGS. 8A and 8C. Plot 806 is the pressure applied by the brakes as result of depressing the brake pedal. In the example of FIG. 8A, the brake pedal is depressed between time 6 seconds and time 8.5 s. Signal 808 represents the state of the shift. In various embodiments, in order for the creep control system to remain active or be active, the shift must remain in a particular state that is the same as the shift state when the creep mode was activated.

Plot 810 is a plot of the acceleration that results from an input torque and application of the brakes. Between times 2 and 6 seconds, the torque is ramped up, and so the acceleration increases. Between times 6 seconds and about 8.5 seconds the brakes were applied and so the acceleration plot dips into negative values between time 6 seconds and 8.5 seconds, indicating a deceleration. Plot 812 is a plot of the speed of the vehicle that results from the acceleration and brakes. Also, between times 6 seconds and 8.5 seconds the speed decreases, because of the application of the brakes. Plot section 814 shows the section of the plot of the acceleration that result from the maximum creep torque. Axis 816 represent the time, which may be measured in seconds, for example. Axis 818 represents the magnitude of the physical parameter associated with each plot. Since each plot has different units, the units that the values of axis 418 represent is different for each plot.

In plot 800, initially the creep torque control logic is fully activated at the end of 2 seconds as indicated by plot 802. The creep torque control logic increases the torque between about 2 seconds and 5 and ½ seconds. As long as the brakes and accelerator have not been engaged, as indicated by signal 804 and plot 806, the acceleration is increased. However, the shift was already engaged at about 1 seconds, as indicated by plot 808. As a result, the acceleration increases from the time two seconds until about 5 and ½ seconds, as indicated by plot 810. Similarly, the speed increases between about 2 seconds and 5 and ½ seconds, as indicated by plot 812. However, at about time 5 and ½ seconds, the driver, in this example, decided to press on the brakes and continued to press on the brakes until about 8 and ¾ seconds. As a result, during the time between 5 and ½ seconds and 8 and ¾ seconds, the acceleration and speed decrease. Similarly, as a result of the application of the brakes, the speed initially decreases to a relatively constant speed at about 7 seconds, but then begins to increase as the brake is being released or after the brake is released, starting at 8 seconds. Once the brake is no longer engaged (e.g., fully released), the acceleration is kept at the current creep torque level, which is the creep torque, just before braking. As a result of the constant acceleration, the speed increases after about 8 and ¾ seconds, which is after the brake pedal is fully released.

Figure 8B:
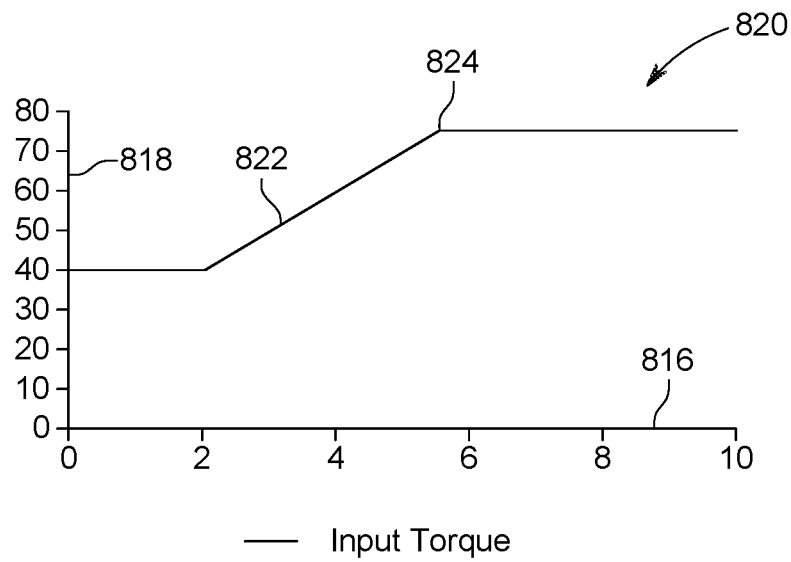
FIG. 8B illustrates a graph of an example input torque used for controlling creep torque.
Figure 8C:
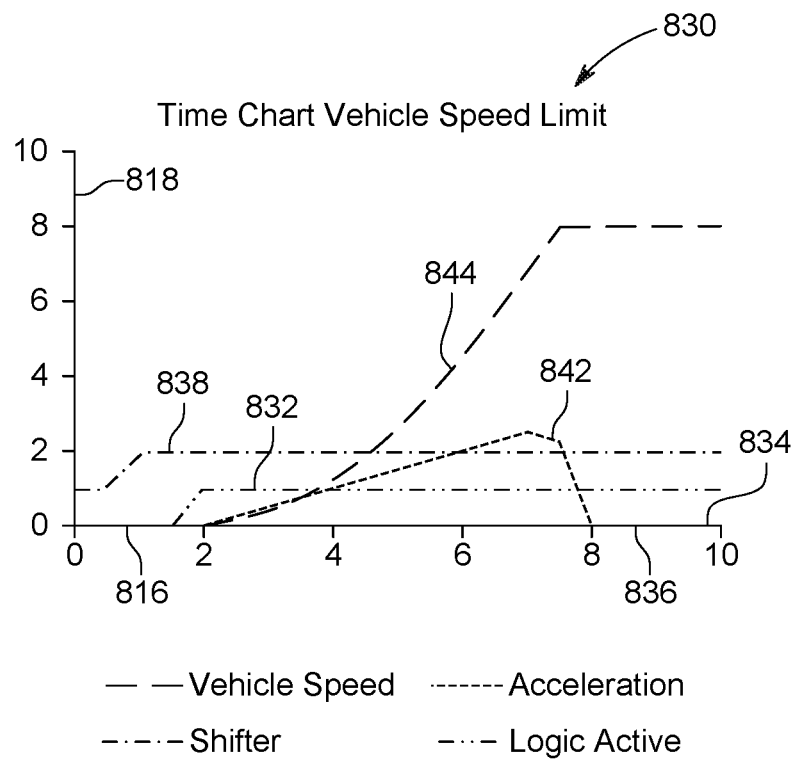
FIG. 8C illustrates an example timing chart of other inputs and the resulting outputs for controlling creep torque.

FIG. 8B illustrates a graph 820 of the input torque, which corresponds to the input torque of the example of FIG. 8A. Plot 822 is a plot of the input torque. Point 824 is the point of plot 822 at which the input torque stops decreasing and is kept constant. At the time at which point 824 occurs, a command is issued to cause the creep torque logic to keep the torque constant so that no acceleration results from changing the torque. Point 824 occurs at the same time as, and as a result of, detecting the engagement of the brakes.

FIG. 8C illustrates a plot 830 of representations of another example of inputs that may be received and the resulting outputs, related to the creep torque control. Plot 830 shows a plot 832 indicating when the creep torque control logic is active (similar to plot 802). Plot 830 illustrates the behavior when the brake is not engaged in contrast to plot 802 in which the brake is engaged. Signal 834 is the signal from the accelerator pedal, similar to signal 804, and plot 836 is the pressure applied by the brakes as result of depressing the brake pedal, similar to plot 806.

However, in the example of graph 830, the brake pedal and accelerator pedal are never engaged, and thus their plots (signal 834 and plot 836) are indistinguishable from axis 816. Signal 838 represents the state of the shift, similar to signal 808. The shift is in the state for the creep torque control (e.g., reverse) prior to activating the creep torque control system and is never taken out of the state for the creep control system. Consequently, the creep control of FIG. 8C is never interrupted.

Plot 840 is a plot of the acceleration resulting from the input torque, similar to plot 810, and plot 842 is a plot of the resulting speed, similar to plot 812. However, in contrast to example of graph 800, since the brake is never engaged in plot 830, the acceleration continues to increase until about 7 seconds, at which point the acceleration is decreased. The decrease in acceleration of plot 830 may occur after reaching a threshold speed that is lower than the target speed. The decrease in acceleration of plot 830 may be chosen so that the speed does not exceed a desired maximum. The decrease in acceleration of plot 830 may be chosen so that the change in acceleration is more gradual, than were the acceleration immediately decreased to no acceleration. The rate of decrease of the input torque may be anything from zero to negative infinity (i.e., an immediate drop of the input torque to zero). In various embodiments, the input torque is decreased smoothly.

At about 7 and ½ seconds, acceleration is decreased at a second rate. The second rate may be essentially negative infinity—or a sudden drop to zero acceleration. As can be seen in FIG. 8C, the second rate has a higher magnitude than the first rate, but since both rates have negative values the second rate has a lower value than the first rate. The second rate at which the acceleration is decreased results from switching from the mode in which the speed is kept constant to a mode in which feedback control is used to maintain the target speed. Using feedback to maintain the speed at the target speed effectively turns off the acceleration.

During the trailer hookup, for example, the creep control system can use the distance to the ball as a feedback to control when to reduce creep torque. This way, the speed is easier to control using only the creep torque without using the accelerator for driving the vehicle.

Figure 8D:
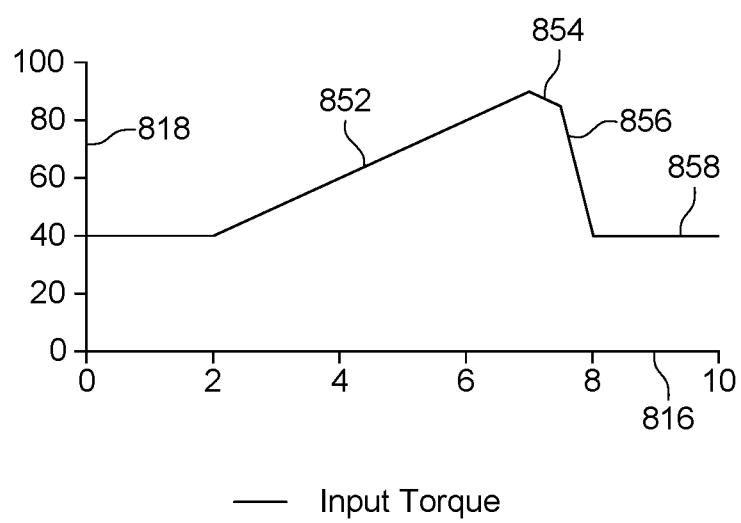
FIG. 8D illustrates a graph of an example input torque used for controlling creep torque.

FIG. 8D illustrates a graph 850 of the input torque, which corresponds to the input torque of the example of FIG. 8C. Plot 852 is a plot of the input torque. During section 854 of plot 852, the torque is decreased over a period of time so as to ensure that the desired creep-generated-vehicle-speed is met. Section 854 is optional. For example, the input torque may be immediately decreased to an input torque that results in zero acceleration. In section 856, the feedback control to maintain the target speed begins, which causes input torque to quickly drop to a level that results in zero acceleration or essentially no acceleration. Section 858 of plot 852 shows an idealized plot in which the input torque remains a constant value. The constant value is an input torque at which the acceleration is zero and the creep-generated-vehicle-speed is the target creep-generated-vehicle-speed. However, during section 856, the input torque may be modulated to maintain a desired speed, depending the load conditions and on variations in the load conditions (e.g., due to changes in the terrain). For example, if the road grade increased at 9 seconds, the torque would be increased to meet or stay at the target or max speed.

Figure 8E:
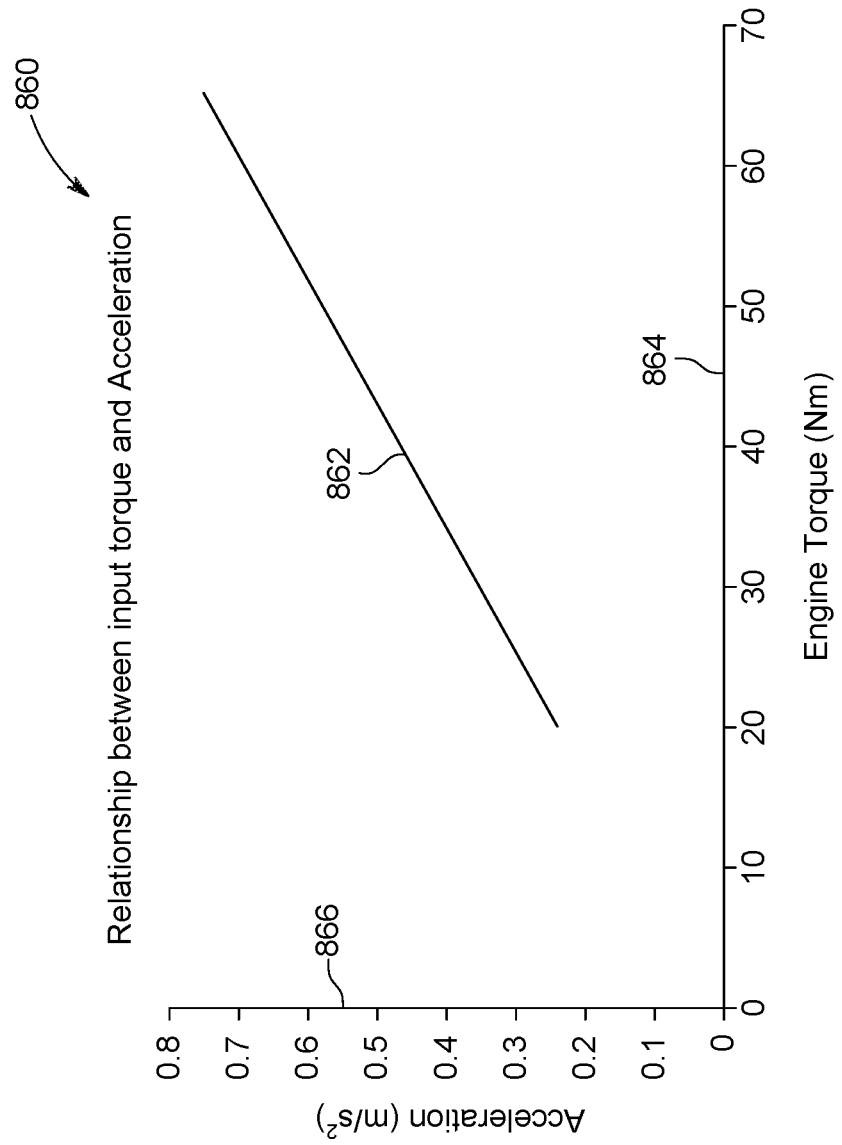
FIG. 8E illustrates an example graph of acceleration as a function of input torque for determining input torque to produce a given acceleration.

FIG. 8E is a plot 860 of an example of the input torque needed to produce acceleration for a particular vehicle. Plot 862 shows the acceleration that results from a particular input toque. For example, a torque of about 39 Newton-meters (Nm) results in an acceleration of the about 0.36 m/s$^2$. Axis 864 is the horizontal axis and has units of torque, which are in Newton-meters. Axis 866 is the vertical axis and has units of acceleration, which is in meters per seconds squared. FIG. 8E illustrates how much acceleration is generated by an input torque of between about 20 Nm to 65 Nm. In the embodiment of FIG. 8E, varying the input torque between 20 and 65 Nm results in an acceleration of between 0.25 and 0.75 m/sec$^2$. In the example of FIG. 8E, the input torque and acceleration have a linear relationship and so setting the input torque constant, set the acceleration constant, as long as the terrain does not change. The conversion depends on the torque converter. Plot 860 may depend on the weight of the vehicle and the capacity of the engine or motor.

FIG. 8E illustrates an example in which the creep torque control is automatically activated (a non-driver activated mode) the input torque rise rate may be limited to 8.5 Nm/s, which creates 0.1 m/s$^2$ rise rate per second (or a rate of increase of acceleration of 0.1 m/s$^3$). For a button or driver activated mode the input torque may be increased at a rate of about 17 Nm/s which may produce a response of 0.2 m/s$^2$ per second rise rate (or a 0.2 m/s$^3$ rise rate of acceleration).

Figure 9:
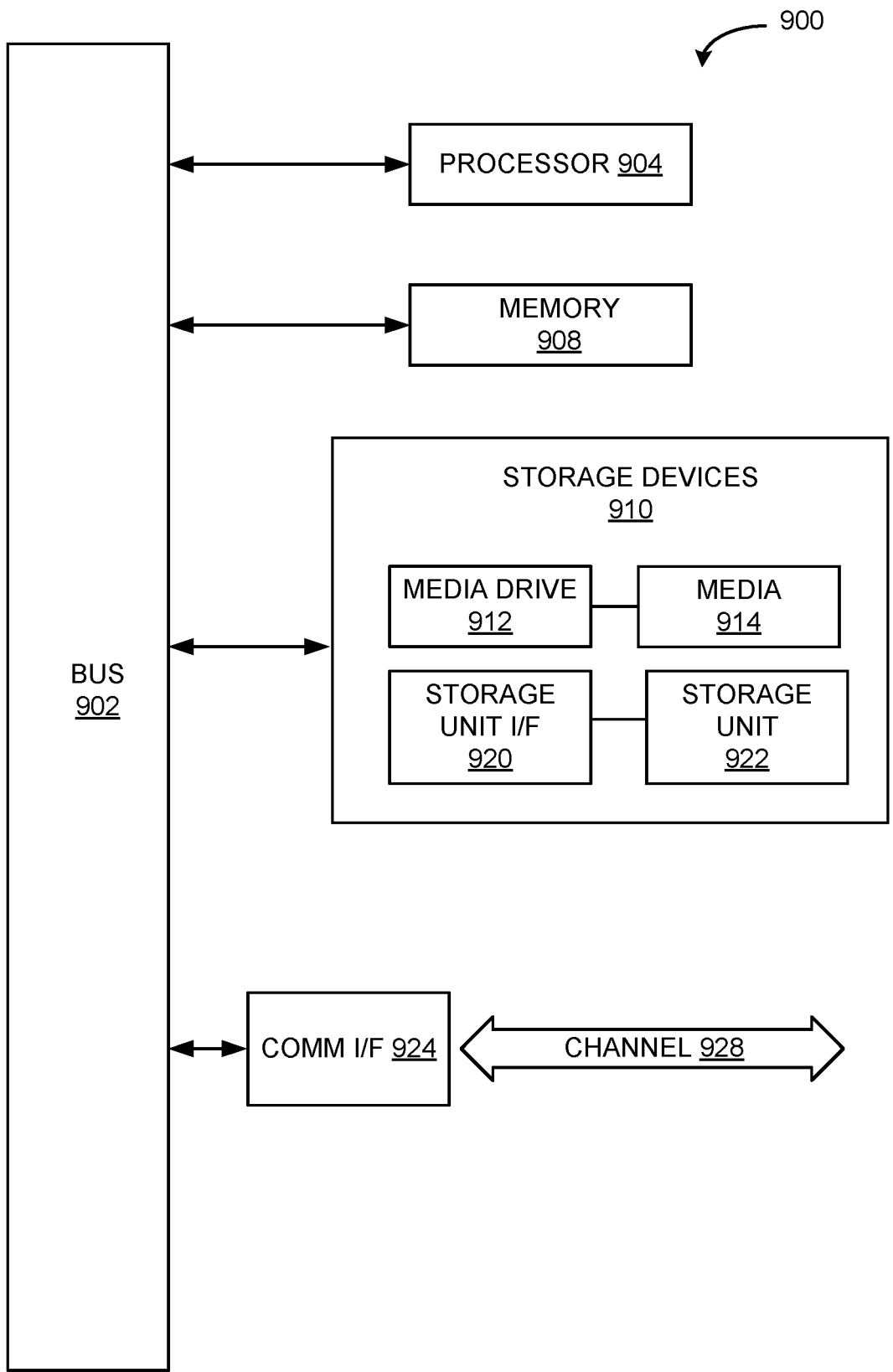
FIG. 9 is an example computing component that may be used to implement various features of embodiments described in the present disclosure.

When overcoming an obstruction there may be situations in which too much torque is generated, causing a jumpy feel to the ride. Optionally, to avoid too much torque from being generated, after reaching a threshold value, there may be ramp down of the torque to bring acceleration under control and avoid the jumpy feel to the ride. For example, the rate of decrease of the acceleration may be −0.2 m/s$^2$ or another value between −0.1 and −0.3 m/s$^2$ As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example—computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to, or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or soft modem, a network interface (such as Ethernet, network interface card, IEEE 802.XX or another interface). Other examples include a communications port (such as for example, a USB port, IR port, RS232 port Bluetooth® interface, or other port), or another communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). Computing component 900 may include or may be included within ECU 50, processor 206 or ICE control circuit 276. When executed, such instructions might enable the computing component 900 to perform features or functions of the present application as discussed herein.

It should be understood that the various features, aspects, and functionalities described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle control system comprising:
a processor;
a memory storing one or more instructions, which when executed, cause the processor to:
determine whether defined conditions for controlling creep torque of a vehicle are met; and in response to determining that the defined conditions for controlling the creep torque of the vehicle are met, produce a control signal to:
increase an input torque;
cause the vehicle to reach a target creep-generated-vehicle-speed; and
provide a selectable acceleration, the selectable acceleration being selected by applying a brake of the vehicle at a selected acceleration, the selected acceleration being applied after the brake is no longer being applied.

2. The system of claim 1, wherein whether the defined conditions are met is determined by determining whether a speed of the vehicle is lower than a threshold speed.

3. The system of claim 1, wherein whether the defined conditions are met is determined by determining whether an acceleration of the vehicle is lower than a threshold acceleration.

4. The system of claim 1, the one or more instructions, which when executed, further cause the processor to:
set a maximum acceleration.

5. The system of claim 1, the one or more instructions, which when executed, further cause the processor to:
determine whether an accelerator is engaged; and
interrupt the control signal when it is determined that the accelerator is engaged.

6. The system of claim 1, wherein the control signal that is produced causes:
increasing the creep torque from an initial creep torque towards a maximum creep torque.

7. The system of claim 1,
the control signal being produced for traveling in a particular direction associated with a particular state of a shift; and
the one or more instructions, which when executed, further cause the processor to:
determine whether the shift was removed from the particular state; and
if it is determined that the shift was removed from the particular state, the selected acceleration that is applied while the brake is not being applied, is no longer selectable by the engaging of the brake at the selected acceleration.

8. The system of claim 1, a torque control being a reverse creep torque control and the one or more instructions, which when executed, further cause the processor to:
determine whether the vehicle was removed from a reverse state; and
if it is determined that the vehicle has been removed from the reverse state, the selected acceleration that is applied while the brake is not being applied, is no longer selectable by the engaging of the brake at the selected acceleration.

9. The system of claim 1, the one or more instructions being activated by receiving input from a user interface.

10. The system of claim 1, the one or more instructions, which when executed, further cause the processor to determine a target distance to travel while controlling the creep torque.

11. The system of claim 1, the one or more instructions, which when executed, further cause the processor to:
detect that the vehicle has been shifted out of reverse; and
in response, reinitiating a creep control parameter to an initial value that the creep control parameter had prior to entering a creep control mode;
during the creep control mode, when the one or more instructions are executed, the processor is caused to:
determine whether the defined conditions for controlling the creep torque are met; and
produce the control signal.

12. The system of claim 11, the creep control parameter including a vehicle acceleration.

13. The system of claim 11, the creep control parameter including the input torque.

14. The system of claim 1, the control signal causing an acceleration of the vehicle to increase until a threshold speed is reached that is less than the target creep-generated-vehicle-speed.

15. The system of claim 14, the control signal causing the acceleration to decrease at a defined rate when the threshold speed is reached, without decreasing the acceleration to zero, until the target creep-generated-vehicle-speed is reached.

16. The system of claim 15, the one or more instructions, which when executed, further cause the processor to, after reaching the threshold speed, control a speed, via a feedback control, to keep the speed at the target creep-generated-vehicle-speed.

17. The system of claim 1, wherein whether the defined conditions for controlling the creep torque are met is determined by detecting whether the vehicle is in position for aligning a portion of a first hookup that is on the vehicle with a portion of a second hookup that is on a trailer, to facilitate hooking up the trailer to the vehicle, via the first hookup and the second hookup.

18. A vehicle control system comprising:
a processor;
a memory storing one or more instructions, which when executed, cause the processor to:
determine whether defined conditions for controlling creep torque of a vehicle are met; and
in response to determining that the defined conditions for controlling the creep torque are met, produce a control signal to:
increase an input torque;
cause the vehicle to increase speed towards a target creep-generated-vehicle-speed;
detect a brake of the vehicle being engaged;
in response to detecting the brake being engaged, setting the input torque to a first input torque that occurred in association with the detecting the brake being engaged.

19. The system of claim 18, the control signal being produced for traveling in a particular direction associated with a particular state of a shift; and
the one or more instructions, which when executed, further cause the processor to:
determine whether the shift was removed from the particular state; and if it is determined that the shift has been removed from the particular state, terminate a creep torque control mode, during which an acceleration that is applied while the brake is not being applied, is selectable by the engaging of the brake at a selected acceleration and disengaging of the brake.

20. A vehicle control system comprising:
a processor;
a memory storing one or more instructions, which when executed cause the processor to:
determine whether defined conditions for controlling creep torque of a vehicle are met, where whether the defined conditions for controlling creep torque are met is determined by:
  determining whether a vehicle acceleration is lower than a threshold acceleration;
  determining whether a vehicle speed is lower than a threshold speed;
  determining whether a brake of the vehicle is engaged; and
  determining whether an accelerator is engaged;
wherein
  if the brake is determined to be engaged, then determining that the defined conditions are not met;
  if the accelerator is determined to be engaged, then determining that the defined conditions are not met;
  if the vehicle acceleration is determined to be above the threshold acceleration, then determining that the defined conditions are not met; and
  if the vehicle speed is determined to be greater than the threshold speed, then determining that the defined conditions are not met; and
in response to the defined conditions being met, produce a control signal
  to increase an input torque, and
  to cause the vehicle to reach a target creep-generated-vehicle-speed,
  wherein after the defined conditions for controlling the creep torque are met, an acceleration that is applied is selectable by applying the brake at a selected acceleration, wherein after the applying the brake to select the acceleration, the input torque is set to produce the selected acceleration when the brake is no longer being applied.

* * * * *